US012708808B2

(12) United States Patent
Webster

(10) Patent No.: US 12,708,808 B2
(45) Date of Patent: Aug. 18, 2026

(54) WILDFIRE DEFENSE SYSTEM

(71) Applicant: CR Buildworks INC., Napa, CA (US)

(72) Inventor: Julian Christopher Rutland Webster, Napa, CA (US)

(73) Assignee: CR Buildworks INC., Napa, CA (US)

( * ) Notice: Subject to any disclaimer, the term of this patent is extended or adjusted under 35 U.S.C. 154(b) by 0 days.

(21) Appl. No.: 18/731,229

(22) Filed: May 31, 2024

(65) Prior Publication Data

US 2025/0367484 A1 Dec. 4, 2025

(51) Int. Cl.

*A62C 5/033* (2006.01)
*A62C 3/02* (2006.01)

(52) U.S. Cl.

CPC ............ *A62C 5/033* (2013.01); *A62C 3/0257* (2013.01)

(58) Field of Classification Search

CPC ..... A62C 3/0257; A62C 3/0292; A62C 5/002; A62C 5/033
USPC .................................. 169/14, 15, 24, 52, 53
See application file for complete search history.

(56) References Cited

U.S. PATENT DOCUMENTS 5,232,052 A * 8/1993 Arvidson ............. G05D 11/131 169/44
5,240,078 A 8/1993 Worthington
5,255,747 A * 10/1993 Teske ........................ B05B 7/32 261/DIG. 26
5,810,089 A * 9/1998 Mack ....................... A62C 8/00 251/344
6,886,639 B2 * 5/2005 Arvidson ........... A62C 99/0036 239/69
9,278,237 B2 3/2016 Cook
2002/0096339 A1 7/2002 Yen et al.
2008/0164039 A1 * 7/2008 Sabo ...................... A62C 5/033 169/62
2010/0038098 A1 * 2/2010 Groonwald ............ A62C 27/00 169/14
2013/0180738 A1 * 7/2013 Kim ......................... C08K 5/01 524/556
2014/0153355 A1 * 6/2014 Springell ............ B01F 35/7176 366/152.2
2019/0015692 A1 * 1/2019 Fieber .................... A62C 5/002
2021/0069659 A1 * 3/2021 Doane ................. B01F 33/5026
2023/0124927 A1 4/2023 Ezra et al.

FOREIGN PATENT DOCUMENTS

JP 2018183242 A 11/2018

* cited by examiner

*Primary Examiner* — Cody J Lieuwen
(74) *Attorney, Agent, or Firm* — Adibi IP Group, PC; Amir V. Adibi; Andrew C. Palmer

(57) ABSTRACT

A wildfire defense system includes a first tank for storing a first fluid, a second tank for storing a second fluid, a mixing valve, two pumps, a controller, and one or more sprayers. The wildfire defense system is controllable remotely allowing property owners to protect structures prior to wildfires without having to be on their property. The first pump pumps the first fluid from the first tank to the mixing valve, and the second pump pumps the second fluid from the second tank to the mixing valve. The controller controls the operations of the pumps and the mixing valve. The mixed fluid is sprayed over a selected geographic region through the sprayers. The apparatus can be remotely activated and the ratio of the first fluid to the second fluid in the mixed fluid is configurable. The system is transportable, allowing for easy relocation or fixed in a dedicated location.

17 Claims, 17 Drawing Sheets

WILDFIRE DEFENSE TRAILER

WILDFIRE DEFENSE SYSTEM OVERVIEW

WILDFIRE DEFENSE TRAILER

FLUID HANDLING SYSTEM

ELECTRICAL SYSTEM

SYSTEM DIAGRAM

MOVABLE TRAILER

PERSPECTIVE VIEWS OF TRAILER

EXPLODED VIEW OF WILDFIRE DEFENSE TRAILER

ELECTRICAL BOXES

ELECTRICAL BOXES

TRAILER RACK WITH WATER TANK

TRAILER RACK -
TOP PORTION

REAR VIEW

SIDE VIEW

TRAILER RACK TOP STRUCTURE

TRAILER RACK -
BOTTOM PORTION

TRAILER RACK STRUCTURES

WATER CANNON ASSEMBLY

GEL TANK

OPERATING WILDFIRE DEFENSE SYSTEM

OPERATING WILDFIRE DEFENSE SYSTEM

REMOTE AND AUTOMATED OPERATION OF
WILDFIRE DEFENSE SYSTEM

WILDFIRE DEFENSE SYSTEM

TECHNICAL FIELD

The present disclosure generally relates to wildfire defense systems, and more specifically, to apparatuses and methods for mixing and dispensing fire retardant fluids.

BACKGROUND INFORMATION

Wildfires are natural or man-made disasters that can cause extensive damage to property and the environment. They can spread rapidly, especially in areas with dry vegetation, and can be difficult to control once they have started. Various methods and systems have been used to combat wildfires, including the use of fire retardant substances.

Fire retardant substances, such as fire retardant gels, are often used to create a barrier between the fire and the material the fire is trying to consume. These substances work by creating a layer of protection that can resist the high temperatures of a wildfire, thereby preventing or slowing down the spread of the fire.

SUMMARY

A wildfire defense apparatus includes a first tank configured to store a first fluid, a second tank configured to store a second fluid, and a mixing valve having multiple fluid input ports and a mixed fluid output port. The apparatus includes a first pump configured to pump the first fluid from the first tank to a first fluid input port of the mixing valve, and a second pump configured to pump the second fluid from the second tank to a second fluid input port of the mixing valve. A controller is configured to control operations of the first and second pumps. One or more sprayers are connected to the mixed fluid output port and are configured to spray mixed fluid over a selected geographic region. The wildfire defense apparatus is controlled remotely without a user needing to be on the property and risk potential harm during a wildfire event.

In various embodiments, the wildfire defense apparatus is mobile or fixed. In mobile embodiments, the wildfire defense apparatus is moved manually, remotely, or autonomously to various locations on a property to protect structures on a property. The wildfire defense apparatus is remotely controlled to spray fire retardant around a surrounding area according to one or more preconfigured and automated cycles. In fixed embodiments, the wildfire defense apparatus is configured to remain in a single location and attached to a dedicated fluid source, tank, or pond. The wildfire defense apparatus is remotely controlled to spray fire retardant around a surrounding area according to a preconfigured and automated cycle. The preconfigured and automated cycles indicate operating characteristics such as direction and duration of spraying, flow rates, and various other operating characteristics.

The apparatus includes one or more of the following features. The first fluid is water and the second fluid is a fire retardant gel also referred to as a thermal gel. In another embodiment, the second fluid is a fire suppressant. The apparatus further includes a communication system configured to receive an activation signal that remotely switches on the apparatus. A controller is configured to control the mixing valve to mix the first fluid and the second fluid in a configurable ratio. The apparatus further includes a power system configured to supply power to the controller, the first pump, the second pump, and the mixing valve. The one or more sprayers include a first sprayer of a first type and a second sprayer of a second type. The first sprayer of the first type is a fixed location sprayer, and the second sprayer of the second type is a manual sprayer. In one embodiment, one or more of the sprayers are remotely controlled by commands received by the controller from the communication system. In one embodiment, one or more sprayers are attached to robotic arm or actuators controllable along one or more dimensions allowing the spray direction to be remotely controlled or cycled according to a preconfigured program.

A method for wildfire defense includes storing a first fluid in a first tank, storing a second fluid in a second tank, controlling a pump system and a mixing valve to combine the first fluid stored in the first tank with the second fluid stored in the second tank according to a configurable ratio thereby generating a third fluid, and outputting the third fluid from one or more sprayers. The first tank, the second tank, the pump system, and the mixing valve are attached or mounted to a transportable structure.

The method includes one or more of the following steps. The first fluid is water and the second fluid is a fire retardant gel. The method further includes receiving an activation signal, wherein a third fluid is generated by mixing the first and second fluids in a configurable ratio in response to the activation signal. The configurable ratio is set to a desired value either by the controller or manually. The method further includes supplying power from a power source to the pump system, wherein the power source is attached to the transportable structure. The pump system includes a first pump and a second pump. The first pump draws the first fluid from the first tank, and the second pump draws the second fluid from the second tank. The first pump is driven by an engine, and the second pump is driven by a motor.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
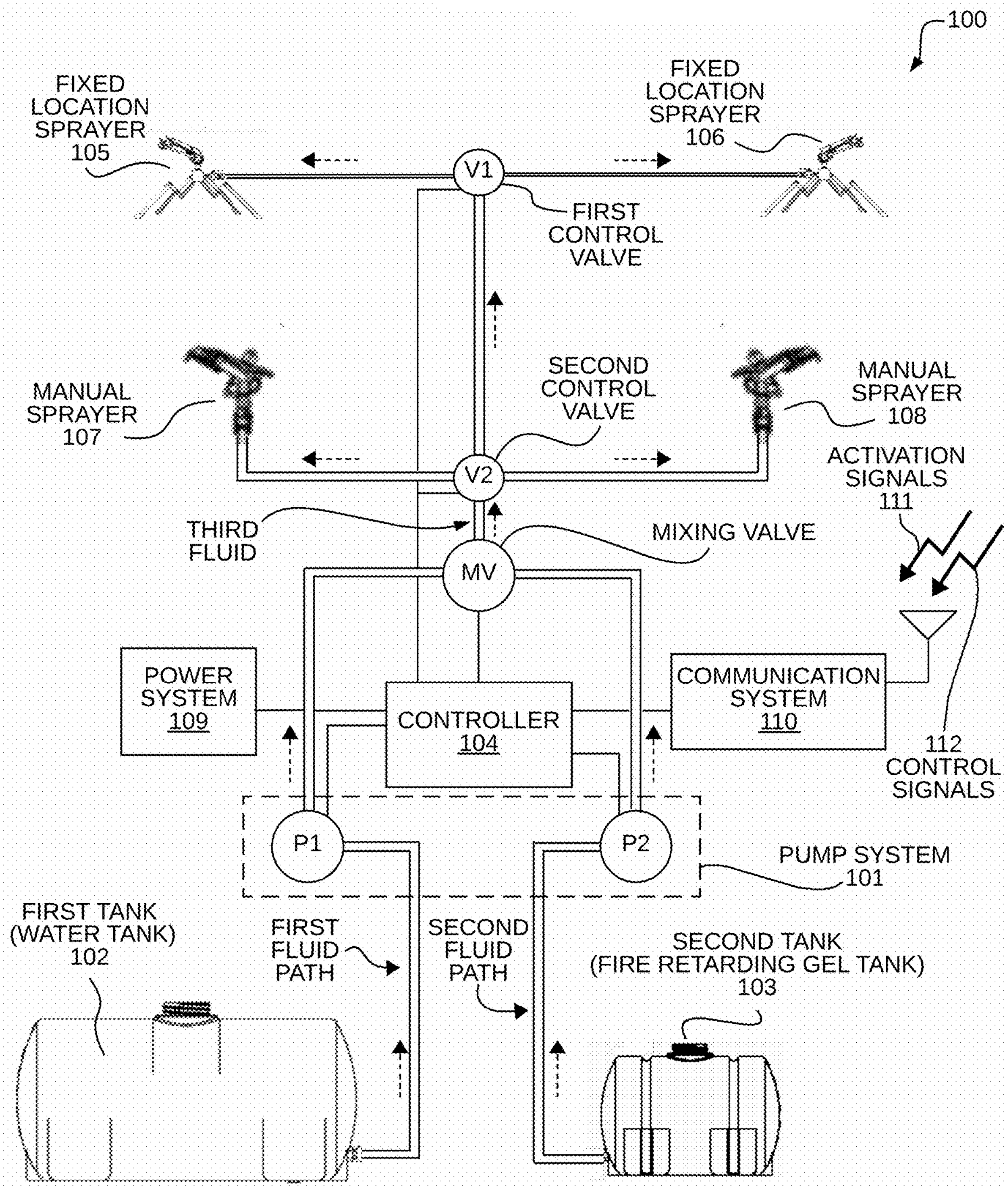
FIG. 1 is a block diagram of a wildfire defense system.

FIG. 1 is a block diagram of a wildfire defense system 100. The system 100 includes pump system 101 having a first pump P1 and a second pump P2. The first pump P1 pumps fluid from a first tank 102 over a first fluid path to a mixing valve (MV). The second pump P2 pumps fluid from a second tank 103 over a second fluid path to the mixing valve (MV). In various embodiments, the first tank 102 is configured to store a first fluid, such as water. The second tank 103 is configured to store a second fluid, such as a fire retardant gel.

The system also includes a controller 104, which is operatively coupled to both the first pump P1 and the second pump P2, as well as to the mixing valve (MV). The controller 104 comprises at least one of a CPU, processor, state machine, programmable memory, logic, interface hardware, discrete hardware, and any software configured to implement the functions of the controller 104 described herein. In some embodiments, the controller 104 is configured to control the pumping operations of the first pump P1 and the second pump P2 of the pump system 101. The first pump P1 pumps the first fluid from the first tank 102, and the second pump P2 pumps the second fluid from the second tank 103. The controller 104 regulates the flow and mixture of fluids from the first 102 and second 103 tanks at the mixing valve (MV) according to a configurable ratio, thereby generating a third fluid that is provided at an output port of the mixing valve (MV). In one embodiment, the third fluid is a mixture of the first fluid and the second fluid, and the ratio of the first fluid to the second fluid in the third fluid is adjustable by the controller 104 based on specific requirements or conditions.

The system further includes one or more fixed location sprayers 105 and 106, which are coupled to the output of the mixing valve (MV). In one embodiment, a first control valve (V1) couples fixed location sprayers 105 and 106 to receive and spray the third fluid from the mixing valve (MV). The fixed location sprayers 105 and 106 are configured to disperse the mixed fluid over a predetermined target area. In one embodiment, the fixed location sprayers 105, 106 are remotely controllable by the controller 104.

The system further includes manual sprayers 107 and 108, which are coupled to the output of the mixing valve (MV) by a second control valve (V2). The manual sprayers 107 and 108 are used to manually spray the third fluid over any desired area as determined by users that operate the sprayers 107 and 108. In one embodiment, the controller 104 is configured to control the operations of the control valves V1 and V2. In another embodiment, the control valves V1 and V2 are manually operated by a user.

In this embodiment, the system 100 also includes a power system 109. The power system 109 supplies energy to the controller 104 and pumps P1 and P2. The power system 109 ensures that the system can operate independently of external power sources. In various embodiments, the power system 109 comprises batteries, solar panels, power generators and/or other stand-alone power systems. In other embodiments, the power system 109 is connected to a mains power line and the system 100 is fixed and not portable.

In this embodiment, the system 100 also includes a communication system 110. The communication system 110 is configured to receive activation signals 111 and/or control signals 112. The activation signals 111 are configured to remotely switch on the system 100, allowing for a rapid response to emerging wildfire threats. The control signals 112 are configured to control various features and functions of the system 100. The control signals 112 may be used to control the mixing ratio of the first and second fluids, the operations of the pumps P1 and P2, and/or the operation of the valves V1 and V1 or the sprayers 105 and 106.

In one embodiment, the first tank 102, the second tank 103, the mixing valve (MV), the first pump P1, the second pump P2, the controller 104, and the one or more sprayers 105-108 are attached to a movable assembly, which can also be referred to as a trailer. This movable assembly provides mobility to the system 100, allowing it to be moved to different locations as the risk of a wildfire changes.

In one embodiment, the system operates to disperse five-hundred (500) gallons of water in the first tank 102 in about five (5) minutes. The system can be operated longer if the first fluid path that receives the output of the first tank 102 is hooked up to a more substantial volume of water, such as a pool, hydrant, or lake. In the absence of wind or trees one embodiment can spray an area of about 2 acres of land with the fire retardant spray that is output from the mixing valve. In one embodiment, one or more of the sprayers 105-108 can be remotely controlled through wireless commands received by the controller from the communication system 110. The power system 109 can be either a stand-alone power system or connected to a power grid to receive continuous power from a power utility or other source.

Additionally, the wildfire defense system 100 includes a system flush and/or rehydrate mode, a thermogel tank recirculation mode, and a mineral oil clean and feed mode. In the system flush and/or rehydrate mode, various tubes and components of the wildfire defense system 100 are flushed with water or other fluids. In the thermogel tank recirculation mode, thermal gels stored in the second tank 103 are recirculated through the system 100. It is generally undesirable for thermal gel to remain in the second tank 103 indefinitely. This mode allows for the thermal gel to be recirculated and/or agitated remotely or in accordance with a preconfigured schedule. In the mineral oil clean and feed mode, the thermal gel is drained from the second tank 103, mineral oil is added to the second tank 103, and cycled through tubing of the system 100. This mode is typically activated at the end of fire season and ensures that the wildfire defense system 100 is maintained fresh with mineral oil when not in fire season.

In accordance with another novel aspect, no water or water-like fluid enters the second fluid path. The system 100 is constructed such that no water or non-mineral based fluid enters any fluid path between the second tank 103 and the mixing valve (MV). Only fire retarding, fire suppressing, or mineral oil is permitted to enter the second fluid path between the second tank 103 and the mixing valve MV. The separation of water or water-like fluid from channels between the second tank 103 and the mixing valve (MV) ensures that a reliable and predictable amount of the second fluid enters the mixing valve (MV) to achieve desired mixing ratios.

Figure 2:
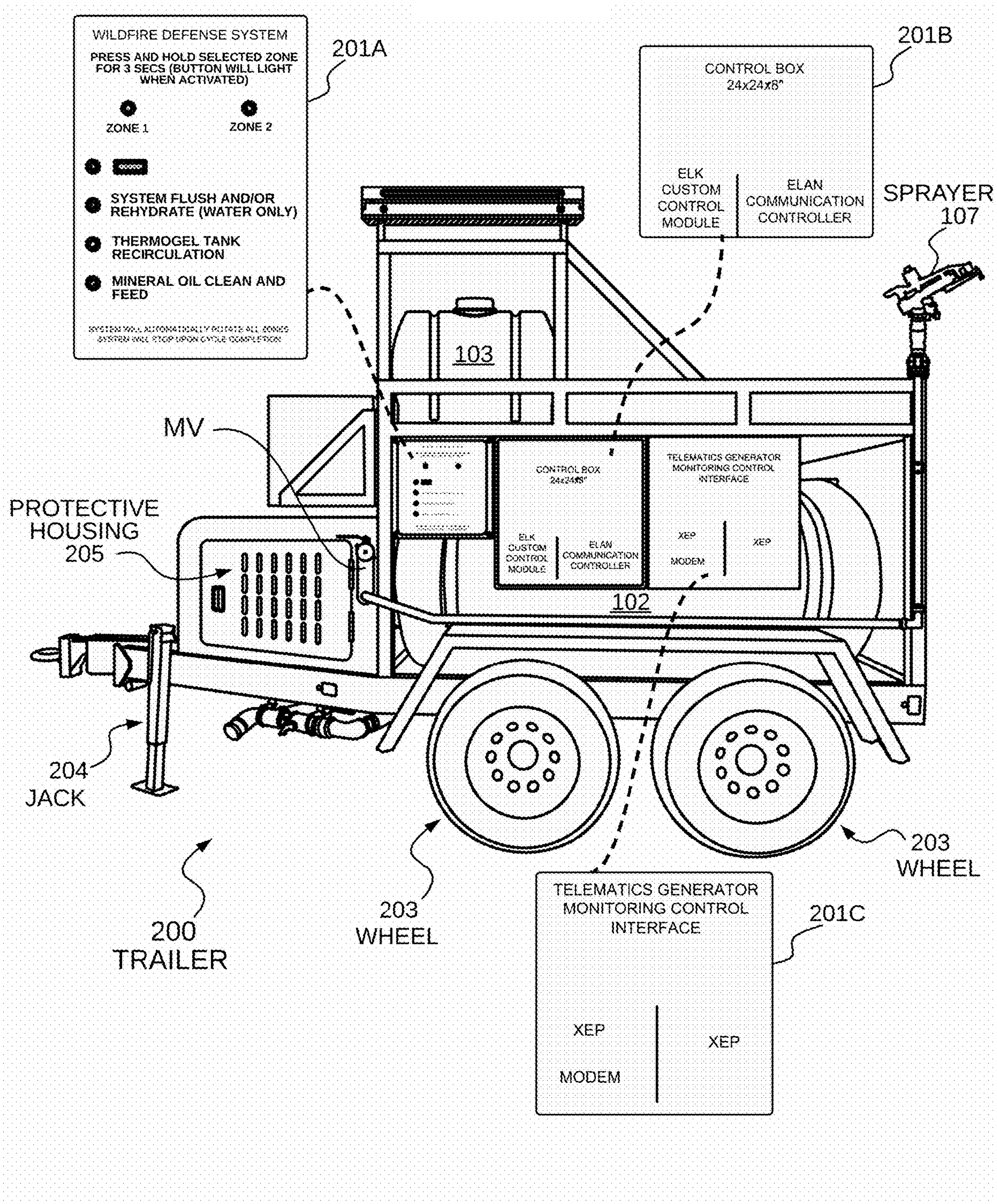
FIG. 2 is a side view of a wildfire defense trailer.

FIG. 2 is a side view of a wildfire defense trailer 200 in accordance with one embodiment. The trailer 200 is configured to secure and transport the components of the wildfire defense system 100. The trailer 200 includes control panels 201A-C, which are mounted on the side of the trailer. In various embodiments, the control panels 201A-C are coupled to or include the controller 104 and provide operational control and monitoring capabilities for the wildfire defense system 100. The trailer 200 also includes pumps P1 and P2, which are situated to facilitate the movement of fluids from the tanks 102 and 103. In various embodiments, the pumps P1 and P2 are configured to pump a first fluid from a first tank 102 to a first fluid input port of a mixing valve (MV), and to pump a second fluid from a second tank 103 to a second fluid input port of the mixing valve (MV).

The controller 104 is configured to control operations of the first P1 and second P2 pumps. The controller 104 is configured to combine the first fluid stored in the first tank 102 with the second fluid stored in the second tank 103 according to a configurable ratio, thereby generating a third fluid that forms a fire retardant spray.

The trailer 200 also includes a protective housing 205 that secures and protects an engine, battery, generator, and the pumps P1, P2. In various embodiments, the generator is part of a power system configured to supply power to the components of the wildfire defense system. The power system provides stand-alone power to ensure that the system 100 can operate independently of external power sources, thus providing a reliable source of energy for the remote operation of the system 100. In the example of fixed embodiments where the wildfire defense system 100 is stationary, the power system is coupled to a power grid to receive power directly from a power utility.

Trailer wheels 203 support the trailer for mobility, and a stabilizing leg or jack 204 is deployed to secure the trailer in a stationary position during operation. A mounted sprayer or nozzle 107 is positioned at the top of the trailer, ready to disperse fire retarding or suppressing fluids over a selected geographic region. In some embodiments, one or more sprayers, which include the mounted sprayer or nozzle 107, are connected to the mixed fluid output port of the mixing valve and configured to spray the mixed fluid over a selected geographic region.

A method for wildfire defense is provided that includes storing a first fluid in a first tank, such as the first fluid tank 102 shown in FIG. 2. This first fluid is stored in the first tank 102 until it is ready to be used in the firefighting process. Similarly, the method also includes storing a second fluid in a second tank, such as the secondary tank or storage 103 depicted in FIG. 2. This second fluid is stored separately from the first fluid until it is ready to be mixed with the first fluid.

The method includes controlling a pump system and a mixing valve to combine the first fluid stored in the first tank 102 with the second fluid stored in the second tank 103 according to a configurable ratio, thereby generating a third fluid. The pump system includes the pumps P1 and P2 shown in FIG. 2, which are configured to pump the first fluid from the first tank 102 to a first fluid input port of the mixing valve (MV), and to pump the second fluid from the second tank 103 to a second fluid input port of the mixing valve (MV).

The method also includes outputting the third fluid from one or more sprayers, such as the mounted sprayer or nozzle 107 depicted in FIG. 2. These sprayers are connected to the output of the mixing valve and are configured to spray the mixed fluid over a selected geographic region. In various embodiments, the first tank 102, the second tank 103, the pump system 101, and the mixing valve MV are mounted on a transportable structure, such as the trailer 200 shown in FIG. 2. This transportable structure allows the system and methods to be operated in a variety of locations, providing flexibility in the deployment of the wildfire defense system.

In various embodiments, the method further includes supplying power from a stand-alone power source to the pump system. The power source is also attached to the transportable structure within the protective housing 205 and includes a generator, battery, and engine. The power source provides the energy that is used to operate the pump system 101, ensuring that the pump system 101 can function effectively in remote locations to move the fluids through the system 100.

Figure 3:
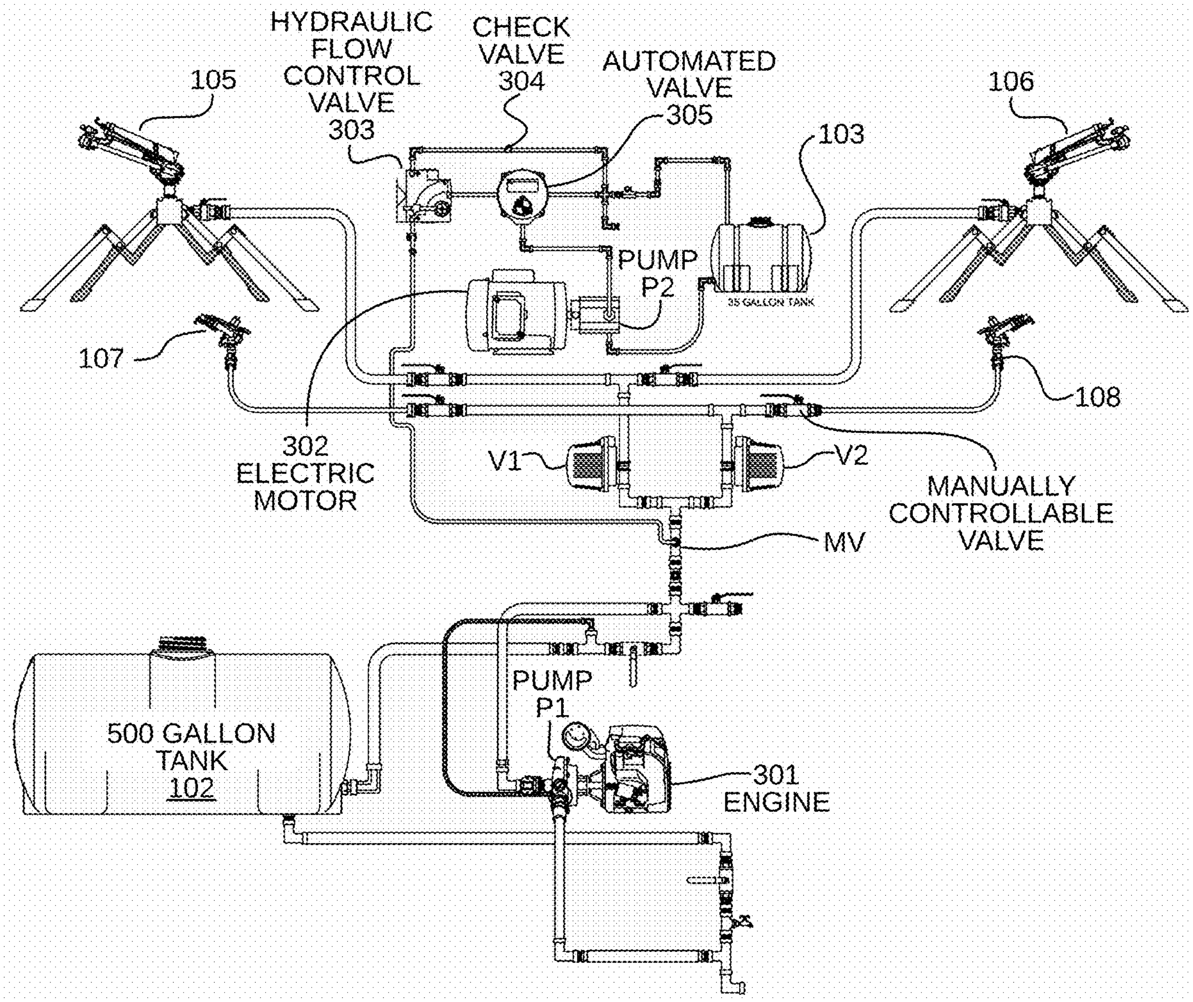
FIG. 3 is a diagram of a fluid handling system for use with the wildfire defense system.

FIG. 3 is a diagram of an embodiment of a fluid handling system for use with the wildfire defense system. The main fluid tank 102 is connected to the pump P1 driven by engine 301, which is powered by a generator or power unit, to move fluid through the system. The pump P1 is configured to pump a first fluid from the first tank to a first fluid input port of a mixing valve (MV). In a primary mode, the second pump P2 is configured to pump a second fluid from the second tank 103 through an inlet of an automated valve 305 and a first outlet of the automated valve 305, a flow control valve 303 to a second fluid input port of the mixing valve (MV). This configuration allows for a mixture of fluids from both tanks to be created at the MV, which can be adjusted according to specific requirements or conditions. Additionally, in a recirculation mode, pump P2 pumps the second fluid through the inlet of the automated valve 305 and a second outlet of the automated valve 305 back into the second tank 103.

In various embodiments, the secondary tank 103 is smaller in size than the main fluid tank 102, and is configured to store a second fluid, such as a fire retardant gel. The valves V1 and V2 control the flow of the mixed fluid from the MV to the various sprayers 105-108. Also included are a variety of manually controllable valves to configure the spraying and/or perform system maintenance.

Figure 4:
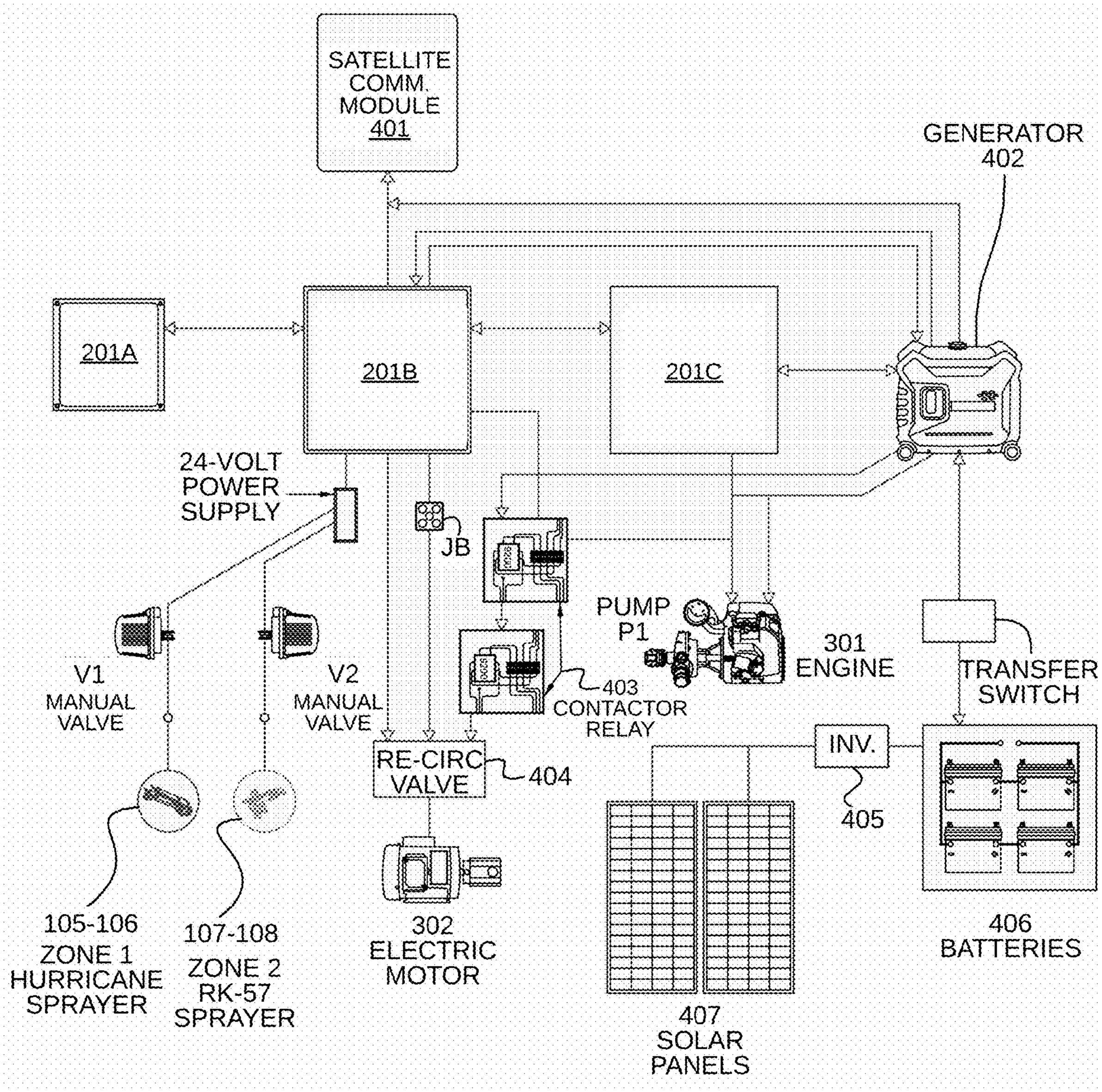
FIG. 4 is a diagram of an electrical system for use with the wildfire defense system.

FIG. 4 is a diagram of an electrical system for use with the wildfire defense system 100. The electrical system illustrates the system's electrical components and their interconnections. A satellite communication module 401 interfaces with the control panel 201B, which is powered by the generator 402.

The satellite communication module 401 is part of the communication system 110 shown in FIG. 1. The satellite communication module 401 wirelessly receives activation and control signals that control several operations of the wildfire defense system 100. A battery array 406 provides additional power, and the batteries are charged by solar panels 407 that provide charging power to the batteries through a solar inverter 405.

The control boxes 201A-C provide control signals to control operation of the components of the wildfire defense system including valve V1 and V2, electric motor 302, contactor relay 403, the pump P1 and engine 301 combination. Also used during operation is a recirculation valve 404 that is connected to receive power from the electric motor 302. A junction box (JB) and transfer switch are also used in the implementation.

Figure 5:
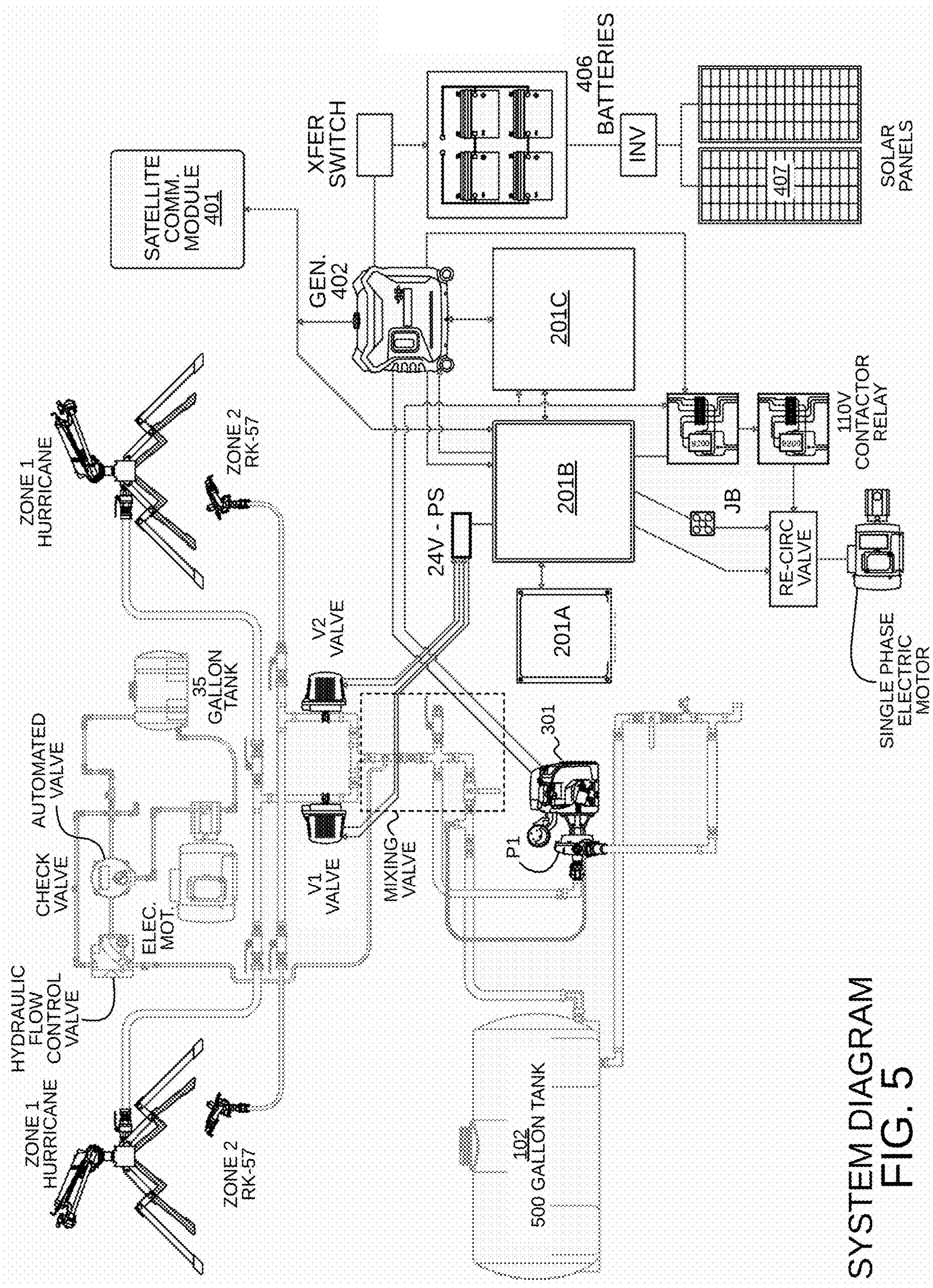
FIG. 5 is a system diagram of a wildfire defense system.

FIG. 5 is a diagram of the electrical and fluid flow system of the wildfire defense system 100 shown combined in the same figure.

Figure 6:
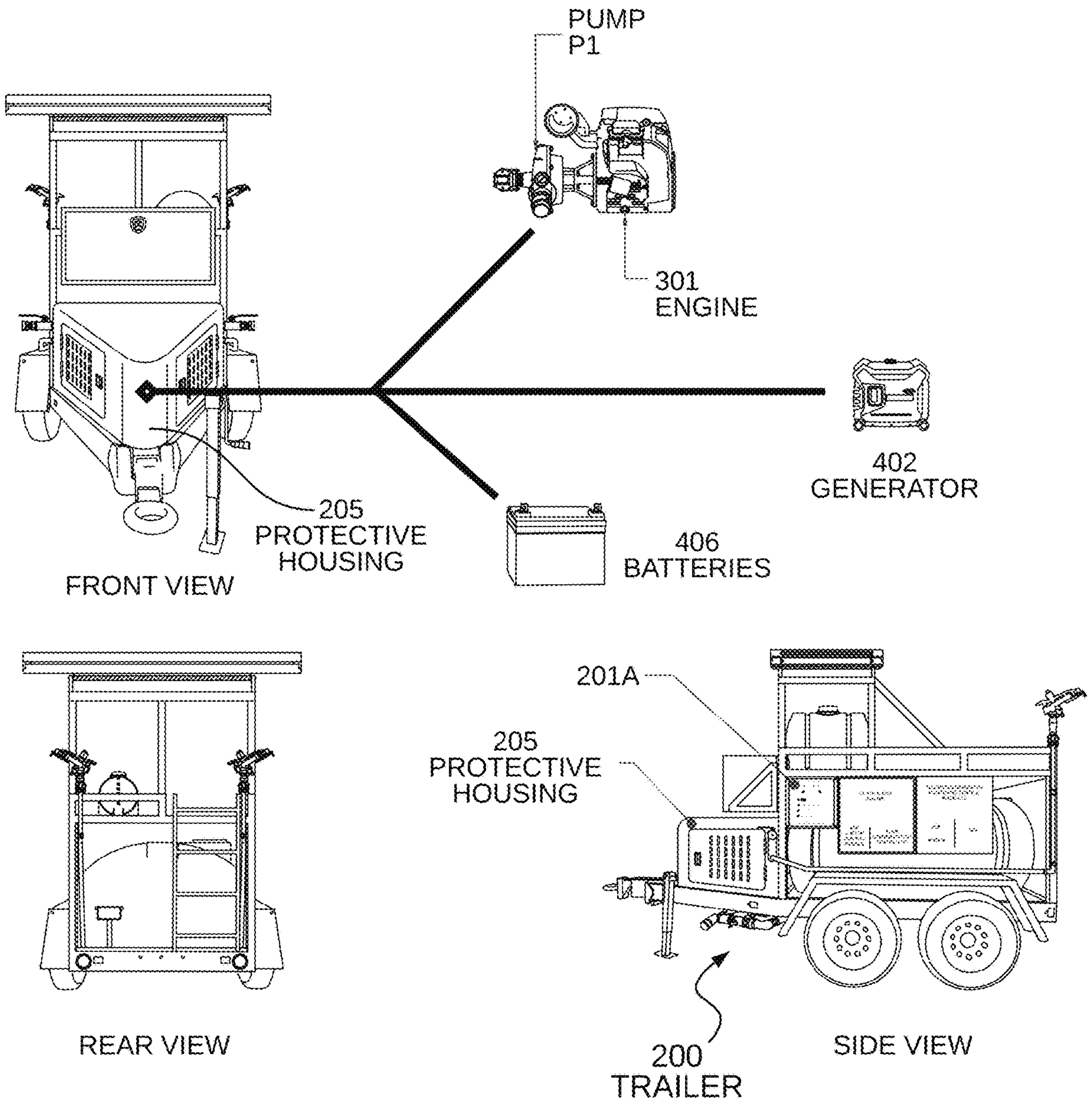
FIG. 6 is a diagram showing various views of a wildfire defense trailer that includes a pump, generator, and battery.

FIG. 6 is a diagram showing various views of a wildfire defense trailer 200 that includes a pump P1, engine 301, generator 402, and batteries 406. The front view shows the layout of the trailer with a protective housing 205 provided to protect the engine 301, pump P1, batteries 406, and generator 402. The protective housing 205 provides a protective barrier for these components, shielding them from environmental factors such as dust, moisture, and impact damage. This housing ensures the longevity and reliability of these components, contributing to the overall durability and effectiveness of the wildfire defense trailer.

The side view provides a profile perspective of the trailer with the automation button box 201A visible. This automation button box 201A is used for controlling the apparatus, allowing for both automatic and manual operation of the system. In various embodiments, the automation button box 201A includes buttons or switches for controlling various functions of the system, such as starting or stopping the pumps, adjusting the ratio of the mixing valve, or activating the sprayers. This configuration provides a user-friendly interface for operating the wildfire defense trailer, facilitating the efficient and effective use of the system.

In this embodiment, the pump P1 comprises a Gorman-Rupp® Engine Driven 60 Series pump, the engine 301 comprises a Honda® GX690 engine, and the generator 402 comprises a Model LC4500i generator. These components and the batteries 406 are labeled and depicted as separate elements, indicating their individual contributions to the system. The pump P1 is responsible for moving fluids from the tanks to the mixing valve, while the engine 301 provides the mechanical power to drive the pump. The generator 402 supplies electrical power to the system, powering the controller and other electrical components. The batteries 406 serve as an energy storage unit, providing a reserve of power that can be used when the generator 402 is not in operation.

These components are integrated into the wildfire defense trailer 200 to facilitate mobile operation. The integration of these components into a single, transportable unit provides a compact and efficient solution for wildfire defense, allowing for the rapid deployment and operation of the system in response to emerging wildfire threats.

The control panels 201A-C provide operational control of the wildfire defense trailer system 100. In some embodiments, the control panels 201A-C are configured to control operations of the first and second pumps to combine the first fluid stored in the first tank 102 with the second fluid stored in the second tank 103 according to a configurable ratio, thereby generating a third fluid. This third fluid is a mixture of the first fluid and the second fluid, and the ratio of the first fluid to the second fluid in the third fluid is adjusted based on specific requirements or conditions.

Figure 7:
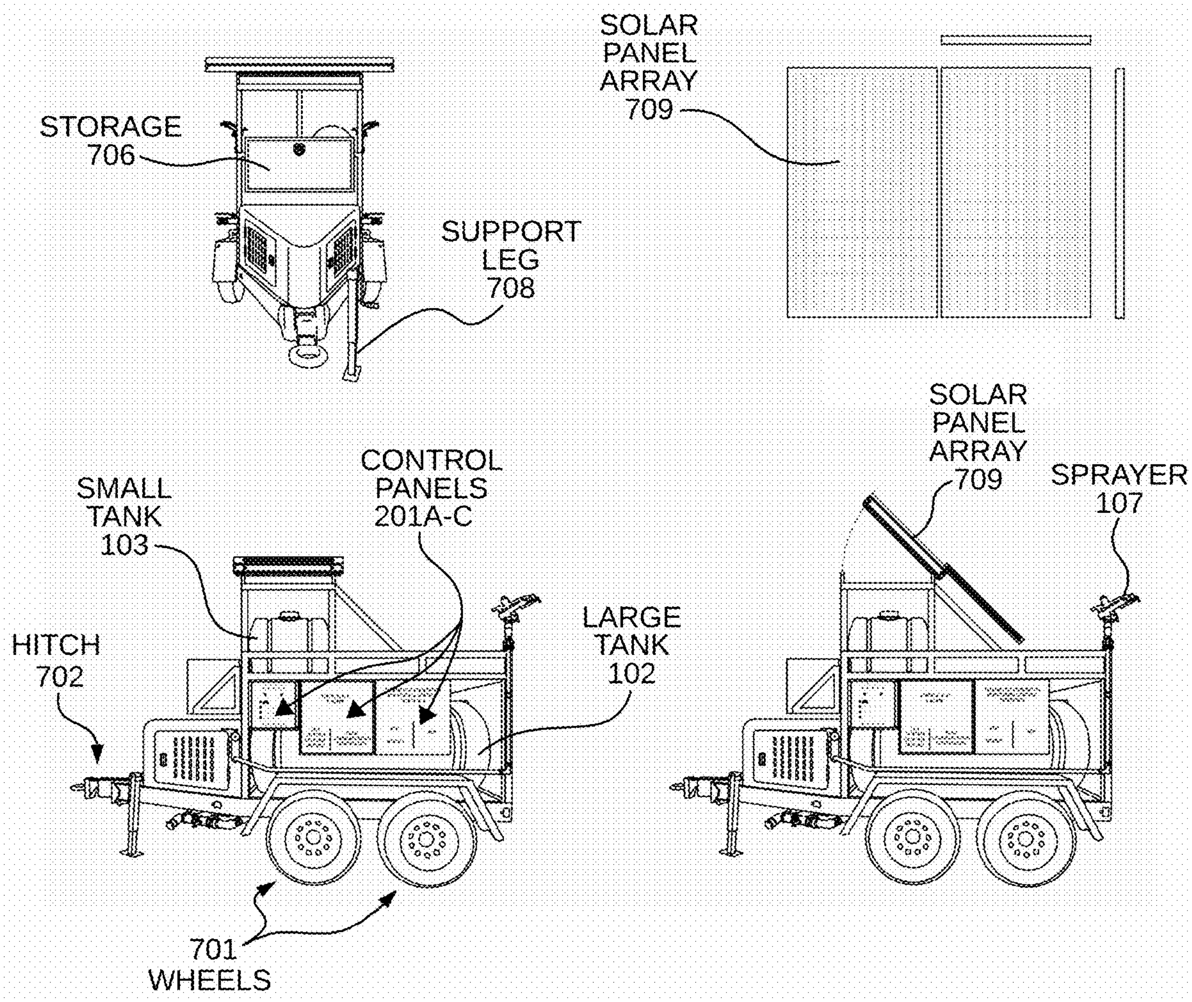
FIG. 7 is a diagram of various perspective views of the wildfire defense trailer showing the arrangement and relationship of various components.

FIG. 7 is a diagram of various perspective views of the wildfire defense trailer showing the arrangement and relationship of various components. The trailer wheels 701 provide mobility, allowing the apparatus to be moved to different locations as the risk of wildfire changes. The trailer hitch 702 allows for attachment to a towing vehicle, facilitating the transport of the trailer. The control panels 201A-C provide operational control of the system by providing an interface for controlling the operation of the apparatus. The storage compartment 706 provides space for additional equipment, such as hoses, nozzles, or other firefighting tools.

The large tank 102 and smaller tank 103 store fluids cycled and dispensed throughout system 100. In some embodiments, the large tank 102 is configured to store a first fluid, such as water, and the smaller tank 103 is configured to store a second fluid, such as a fire retardant gel. These tanks are connected to pumps and/or engines, which are configured to pump the first fluid from the first tank 102 to a first fluid input port of a mixing valve, and to pump the second fluid from the second tank 103 to a second fluid input port of the mixing valve. This allows for a mixture of fluids from both tanks to be created, which can be adjusted according to specific requirements or conditions.

The sprayer or nozzle 107 is designed for fluid dispersion, allowing for the mixed fluid to be sprayed over a selected geographic region. In various embodiments, the sprayer or nozzle 107 is connected to the mixed fluid output port of the mixing valve and configured to spray the mixed fluid over a selected geographic region. This allows for the third fluid, which is a mixture of the first fluid and the second fluid, to be dispersed over a targeted area, providing a protective layer against wildfires.

The support leg or stabilizer 708 ensures stability during operation, preventing the trailer from moving or tipping over during operation. The solar panel array 709 supplements power supply, providing an additional source of energy for the operation of the apparatus.

Figure 8:
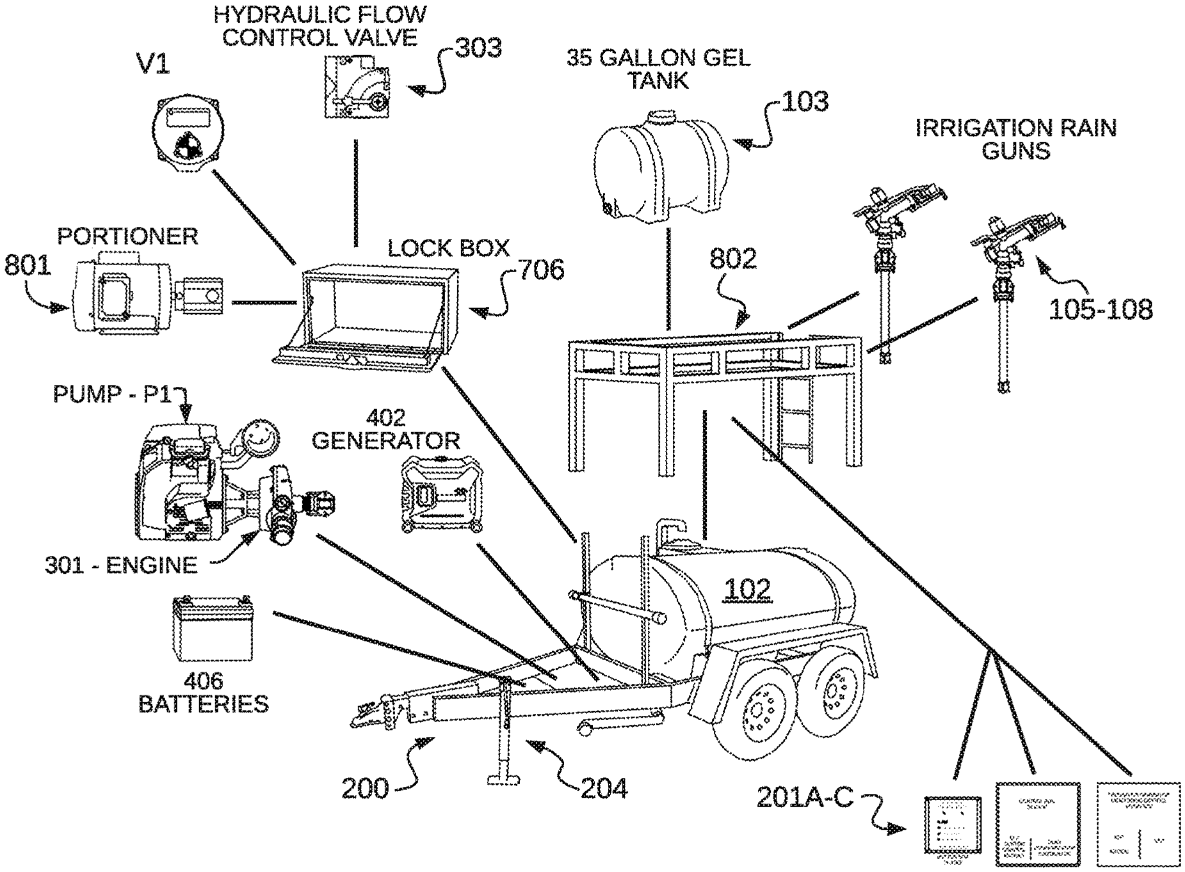
FIG. 8 is a diagram of an exploded view of the components of the wildfire defense trailer.

FIG. 8 is a diagram of an exploded view of the components of the wildfire defense trailer. The assembly includes a 35 gallon gel tank 103, irrigation rain guns or sprayers 105-108, a hydraulic flow control valve 303, an automated valve 305, a portioner 801, a lockbox 706, a pump P1, engine 301, generator 402, and batteries 406. These components are designed to work in concert such that the pump P1 is driven by the engine 301 to move fluids from the tanks 102 and 103 through the mixing valve (MV). The portioner 801 adjusts the mixture of fluids, and the generator 402 provides electrical power to the system. The lockbox 706 is used for secure storage, and the batteries 406 serve as an energy reserve. The irrigation rain guns or sprayers 105-108 are connected to the system to disperse the mixed firefighting fluid over a targeted area.

In some embodiments, the first pump P1 is driven by an engine 301. This configuration allows the first pump P1 to move the first fluid from the first tank 102 to the mixing valve MV with the mechanical power provided by the engine 301. In other cases, the second pump P2 is driven by motor 302. This configuration allows the second pump P2 to move the second fluid from the second tank 103 to the mixing valve MV with the mechanical power provided by the motor 302. This arrangement of the first pump P1 being driven by engine 301 and the second pump P2 being driven by motor 302 provides flexibility in the operation of the pumps, allowing for the efficient movement of fluids from the tanks to the mixing valve.

Figure 9:
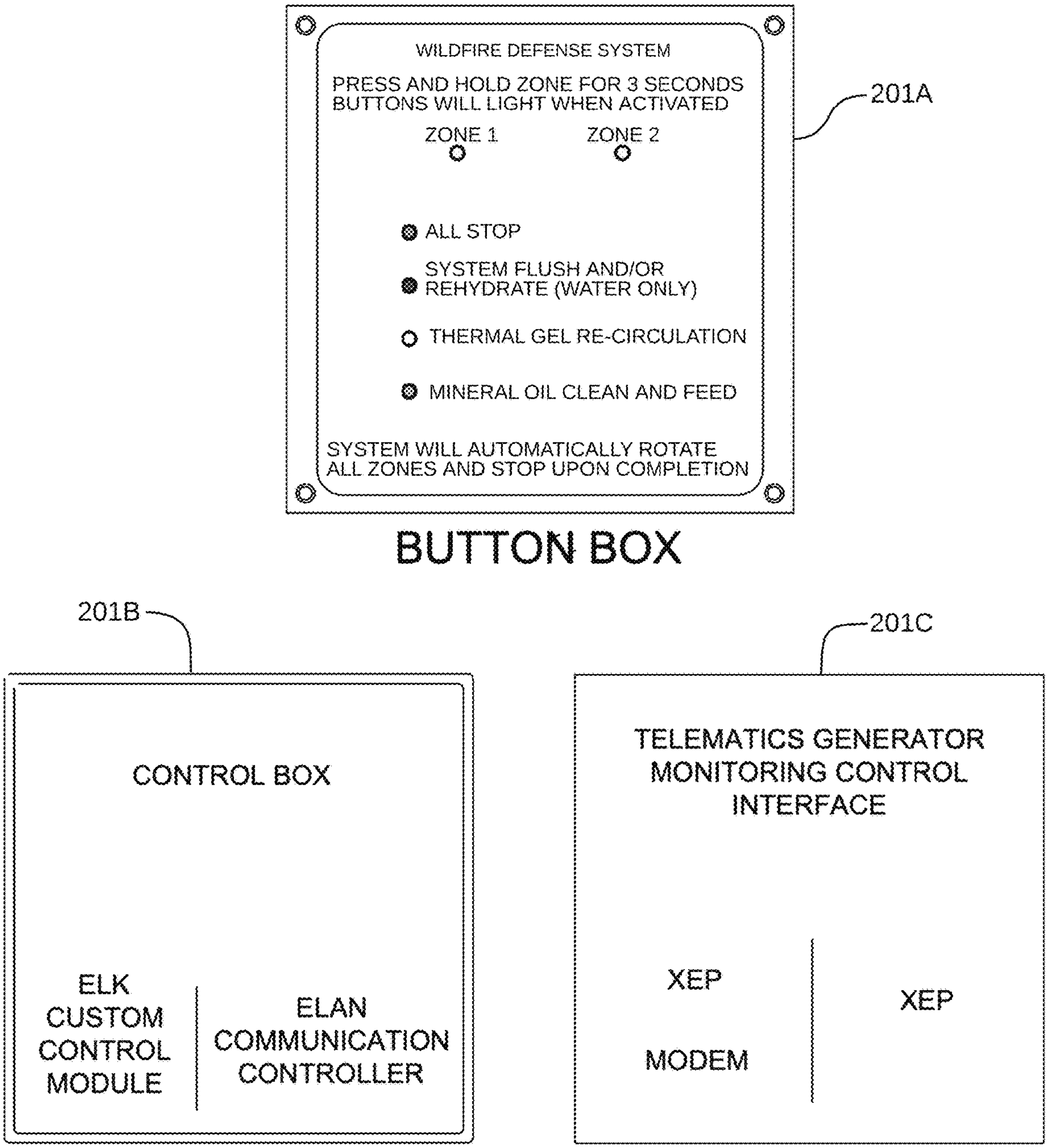
FIG. 9 is a diagram of various electrical boxes associated with the wildfire defense system.

FIG. 9 is a diagram of various electrical boxes associated with the wildfire defense system 100. The electrical boxes includes a central 'WILDFIRE DEFENSE SYSTEM' button box 201A, adjacent to a 'CONTROL BOX' 201B on the left and a 'TELEMATICS GENERATOR MONITORING CONTROL INTERFACE' 201C on the right. The button box 201A provides manual operation of the system 100. The control box 201B controls various components of the system and communicates with remote devices. Telematics box 201C provides telemetry and other monitoring interfaces. Each box is labeled to provide a clear understanding of the functions controlled and monitored by each box.

The button box 201A provides for manual operation if the operator is on the property and wishes to control and operate the system 100. The button box 201A is equipped with status indicator lights for system functions such as power, system fault, normal operation, and manual override. These status indicator lights provide visual feedback on the status of various system functions, allowing for the quick identification of any issues or faults.

Below the button box 201A, the control box 201B includes an 'ELK CUSTOM CONTROL MODULE' and 'ELAN COMMUNICATION CONTROLLER'. The 'ELK CUSTOM CONTROL MODULE' and the 'ELAN COMMUNICATION CONTROLLER' manage the operation of various components and functions of wildfire defense system 100. The ELK CUSTOM CONTROL MODULE enables and disables various valves, switches, motors, pumps, and other components of the system 100. The ELK CUSTOM CONTROL MODULE is available from elkproducts.com. The ELAN COMMUNICATION CONTROLLER handles communication between remote devices, such as mobile phone, tables, headsets, or virtual assistants, and the ELK CUSTOM CONTROL MODULE. The ELAN COMMUNICATION CONTROLLER is available from elanportal.com. The combination of the ELK CUSTOM CONTROL MODULE and the ELAN COMMUNICATION CONTROLLER allows users to remotely control and operate the wildfire defense system 100 over a network in a safe location without users having to be physically present on the property.

The TELEMATICS GENERATOR MONITORING CONTROL INTERFACE 201C includes XEP MODEM and other network devices operable to facilitate communication between the system 100 and external devices or systems.

These elements are arranged to provide a clear and organized interface for controlling and monitoring the wildfire defense system 100. This layout facilitates the efficient operation and maintenance of the system 100, providing easy access to the controls and indicators for various system functions.

Figure 10:
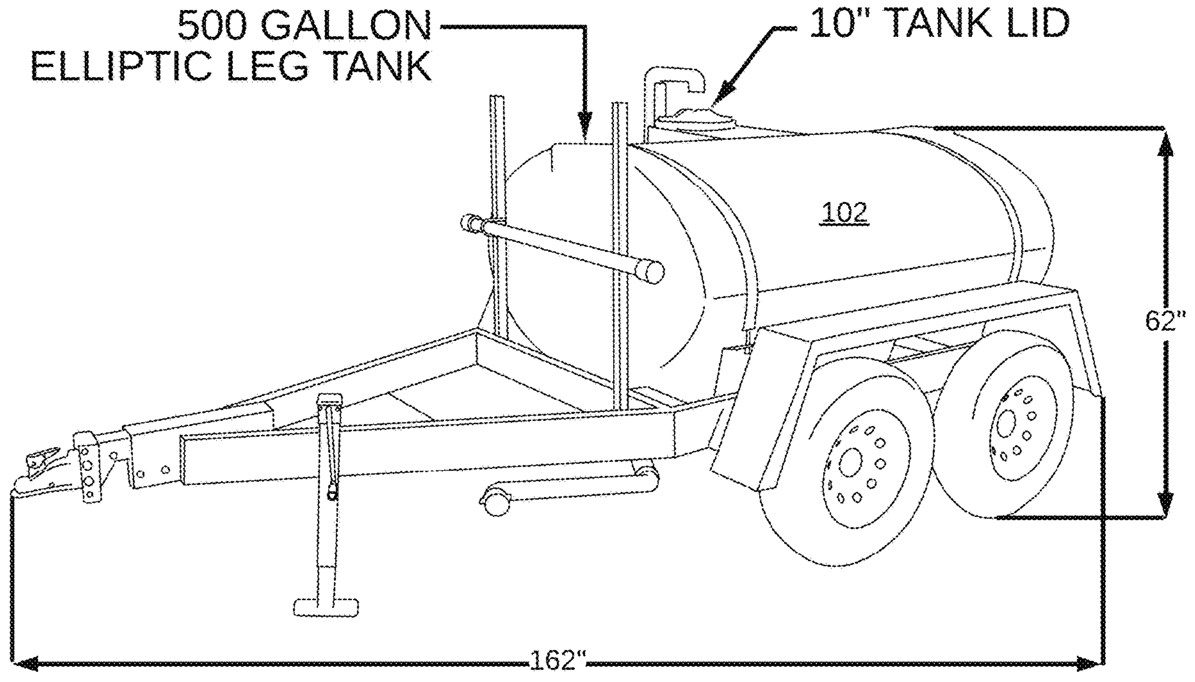
FIG. 10 is a diagram of a perspective view of a wildfire defense trailer outfitted with a large water tank.

FIG. 10 is a diagram of a perspective view of a wildfire defense trailer outfitted with a large water tank. In one embodiment, the water tank 102 is mounted to the trailer and has a capacity of 500 gallons. The 500 gallon capacity of the tank 102 provides a substantial volume of water for firefighting purposes. The tank 102 features a lid with a diameter of 10 inches, labeled as "10" TANK LID." The tank lid covers a large tank opening for filling the tank 102 with water.

In this embodiment, the height of the trailer is 62 inches, as denoted by the label "62"." In this embodiment, the overall length of the trailer is 162 inches. This overall trailer length of 162 inches provides a compact and efficient design for the trailer, allowing for the easy transport and deployment of the wildfire defense system. These measurements provide a clear understanding of the size and storage capacity of the wildfire defense trailer. The tank capacity of 500 gallons, tank lid diameter of 10 inches, wheelbase length of 62 inches, and overall trailer length of 162 inches are all integral dimensions of the apparatus, contributing to its functionality and effectiveness in wildfire defense. It is appreciated that in other embodiments, the provided dimensions vary.

Figure 11:
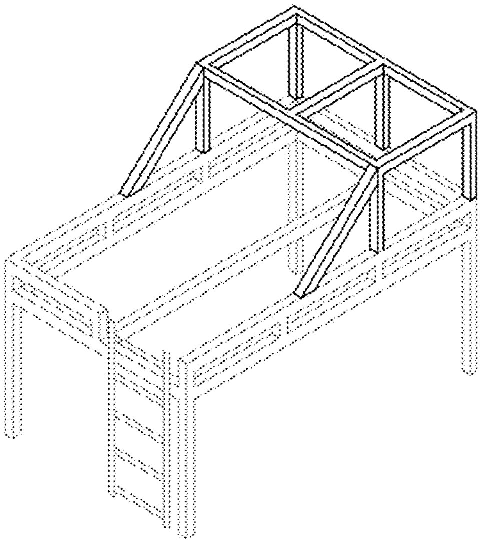
FIG. 11 is a diagram of various views of a trailer rack top structure.
Figure 11:
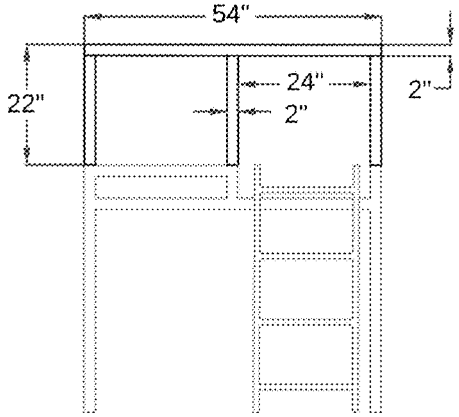
Figure 11:
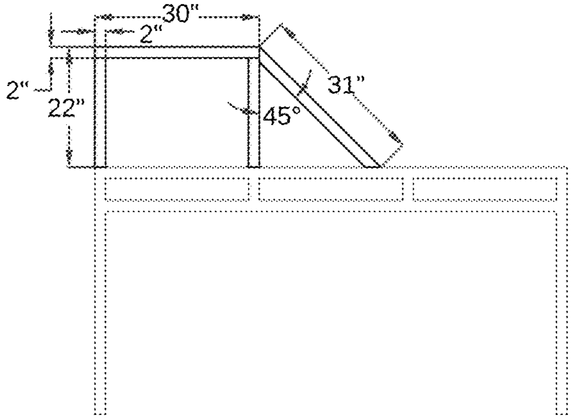

FIG. 11 is a diagram of various views of a trailer rack top portion or structure. The rear view shows an upper rear horizontal beam width of 54 inches and a lower rear horizontal beam length of 27 inches connected by the rear vertical support beam of 24 inches. This configuration provides structural support to the trailer rack, ensuring its stability and robustness. The side view illustrates the side base support beam of 22 inches supporting an upper side horizontal beam of 30 inches and a middle side horizontal beam connected with the side diagonal support beam of 31 inches providing additional stability. This arrangement of beams contributes to the structural integrity of the trailer rack, allowing it to withstand various environmental conditions and operational stresses.

The various views show how the beams and support structures interconnect and illustrate how they work together to form a robust frame. This frame provides a sturdy and durable structure for securing the wildfire defense system 100, ensuring that it can withstand the rigors of operation in various environments and conditions.

Figure 12:
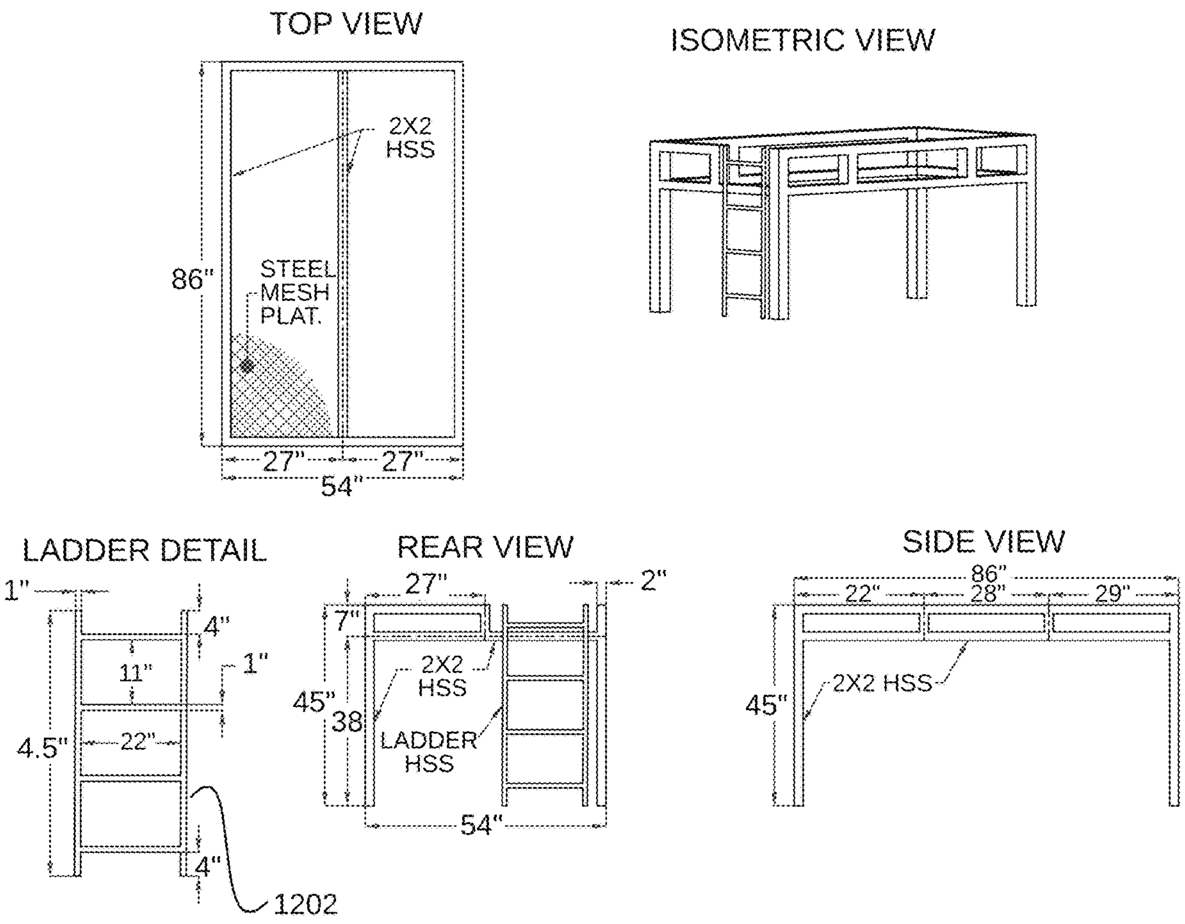
FIG. 12 is a diagram of various views of trailer rack structures.

FIG. 12 is a diagram of various views of trailer rack bottom portion structures. The top view shows the structure comprising standard hollow structural section steel beam 2×2 HSS type. The standard hollow structural section steel beam 2×2 HSS type provides structural support to the trailer rack, contributing to its robustness and durability. These beams are made of a strong and durable material, such as steel, ensuring that the structure can withstand the rigors of operation in various environments and conditions.

The rear view and side view offer different angles of the ladder or access step 1202, the standard hollow structural section steel beam 2×2 HSS type, and the small hollow structural section steel beam 1×1 HSS type, showing their relative positions and connections. The ladder or access step 1202, the standard hollow structural section steel beam 2×2 HSS type, and the small hollow structural section steel beam 1×1 HSS are all integral components of the trailer rack, contributing to its functionality and effectiveness.

The ladder detail further highlights the ladder 1202 measurements, which specifies a particular aspect or dimension of the ladder 1202. This detail provides a clear understanding of the size and design of the ladder 1202, facilitating its use and maintenance.

The perspective views show how the components fit together. These views provide a clear understanding of the arrangement and relationship of the various components of the trailer rack, facilitating the assembly and maintenance of the apparatus.

The steel mesh platform, indicated by a shaded area in the top view, is supported by the beams, providing a stable base for the trailer rack structure. This platform provides a secure and stable surface for the placement of various components of the wildfire defense system 100, such as the tanks, pumps, and/or controller.

Figure 13:
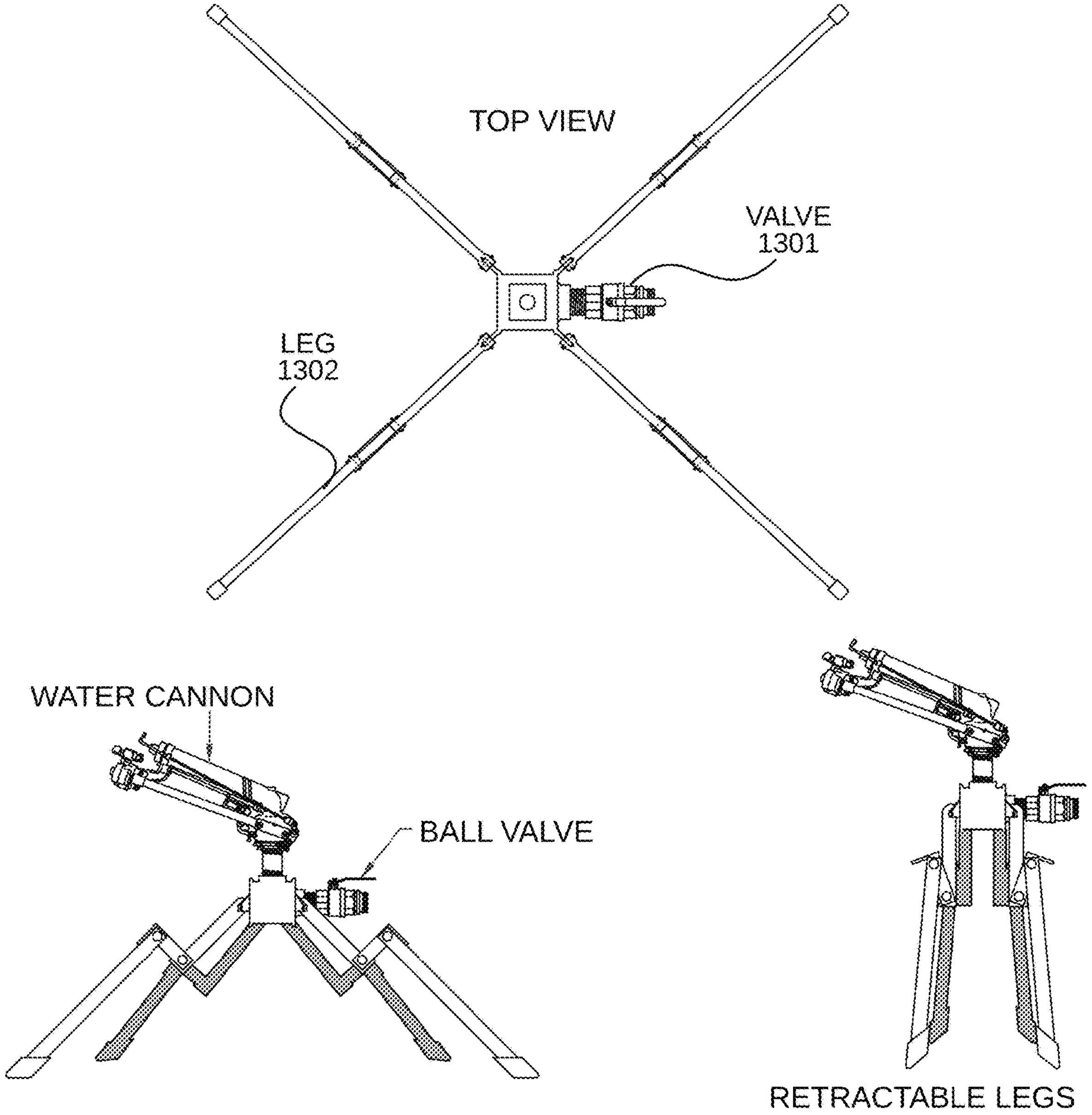
FIG. 13 is a diagram of various views of a water cannon assembly for use with the wildfire defense system.

FIG. 13 is a diagram of various views of a water cannon assembly for use with the wildfire defense system 100. The top view shows the base of the assembly with a valve 1301 at the center and retractable legs 1302 extending outward. The water cannon assembly is configured to pump fluid from the mixing valve (MV). This configuration allows for a mixture of fluids from both tanks to be sprayed over large areas.

The side views illustrate how the water cannon is connected to the mixing valve (MV) via a ball valve, with the retractable legs providing support and stability for the assembly. The water cannon is configured to disperse the mixed fluid over a selected geographic region, providing a protective layer against wildfires. The retractable legs provide stability to the water cannon assembly, ensuring that it remains stable during operation. This configuration provides a compact and efficient solution for wildfire defense, allowing for the rapid deployment and operation of the system in response to emerging wildfire threats.

Figure 14:
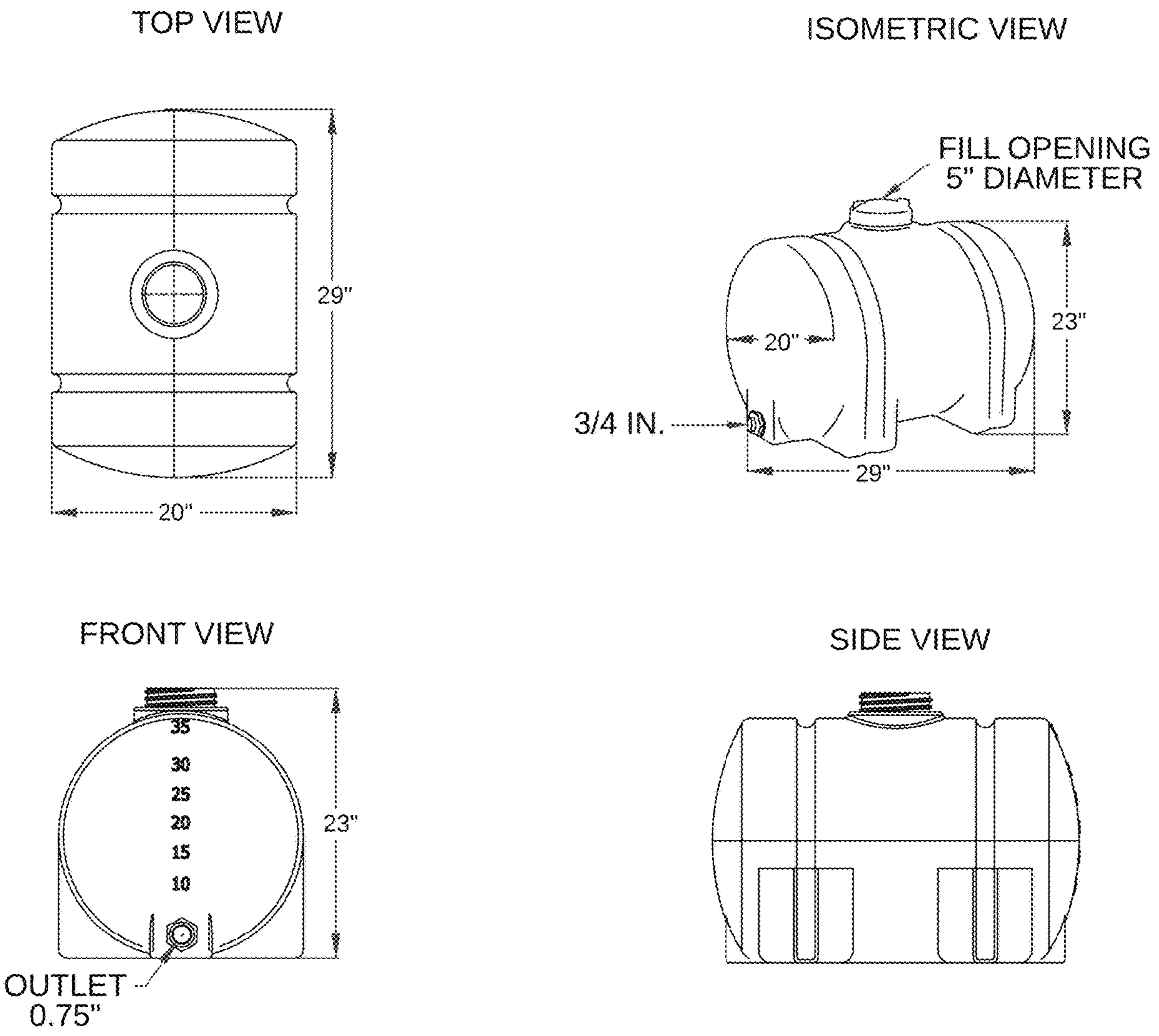
FIG. 14 is a diagram showing various views of a 35 gallon gel tank for the wildfire defense trailer.

FIG. 14 is a diagram showing various views of a 35 gallon gel tank for use with the wildfire defense system 100. The top view shows the tank having a width of 20 inches and tank depth of 29 inches. The front view illustrates the tank height or diameter of 23 inches and a tank outlet having a diameter of 0.75 inches. The side view provides a profile perspective of the tank. The isometric view shows the tank width of 20 inches, tank height or diameter of 23 inches, and tank depth of 29 inches which define the external size of the tank. These dimensions provide a clear understanding of the size of the tank, facilitating the storage and transport of the tank. The fill opening diameter of 5 inches and outlet diameter of 0.75 inches indicate the sizes of the openings for filling and dispensing the tank's contents. These openings allow for the easy filling and dispensing of fluids, facilitating the operation of the wildfire defense apparatus.

The 35 gallon gel tank is configured to store the second fluid of the system, such as a fire retardant gel. This gel is mixed with the first fluid of the system, which in one embodiment is water, in the mixing valve (MV) to create a fire retardant fluid. The fire retardant fluid is then dispersed over a selected geographic region by one or more sprayers, providing a protective layer against wildfires. The 35 gallon gel tank is an integral component of the wildfire defense system, contributing to its functionality and effectiveness in wildfire defense.

Figure 15:
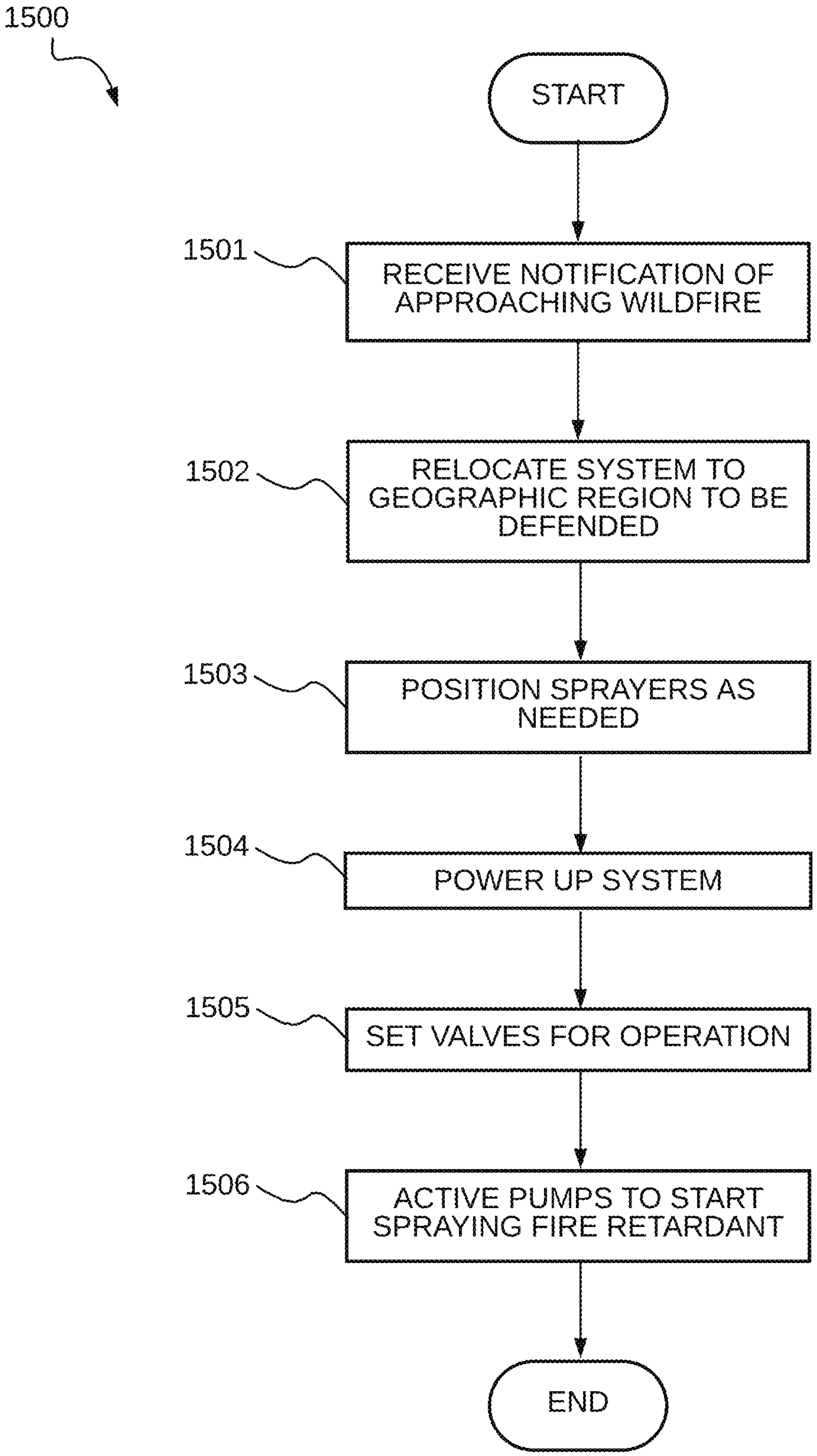
FIG. 15 is a flowchart of a method in accordance with one novel aspect.

FIG. 15 is a flowchart of a method 1500 in accordance with one novel aspect. The method 1500 comprises several steps for operating the system 100, including storing a first fluid in a first tank, storing a second fluid in a second tank, controlling a pump system and a mixing valve to combine the first fluid stored in the first tank with the second fluid stored in the second tank according to a configurable ratio, thereby generating a third fluid, and outputting the third fluid from one or more sprayers. The first tank, the second tank, the pump system, and the mixing valve are attached to a transportable structure, allowing for the method to be implemented in a variety of locations.

In some embodiments, the first fluid is water and the second fluid is a fire retardant gel. The pump system includes a first pump and a second pump, wherein the first pump draws the first fluid from the first tank, and the second pump draws the second fluid from the second tank. The mixing valve is configured to mix the first fluid and the second fluid in a configurable ratio, thereby generating a third fluid that is a mixture of the first fluid and the second fluid. The third fluid is then output from one or more sprayers, which are configured to disperse the third fluid over a selected geographic region.

In various embodiments, the method further comprises receiving an activation signal, wherein the third fluid is generated in response to the activation signal. This activation signal remotely switches on the system 100, allowing for the rapid response to emerging wildfire threats. The method also comprises setting the configurable ratio to a desired value, allowing for the adjustment of the ratio of the first fluid to the second fluid in the third fluid based on specific requirements or conditions.

In some embodiments, the method further comprises supplying power from a power source to the pump system, wherein the power source is attached to the transportable structure. This power source provides the energy that is used to operate the pump system, ensuring that the pump system can function effectively to move the fluids through the system 100. The method also comprises moving the transportable structure while outputting the third fluid from the one or more sprayers, thereby distributing the third fluid throughout an area surrounding the transportable structure. This operation allows for the efficient and effective distribution of the third fluid, providing a protective layer against wildfires over a large area.

In one embodiment, the method 1500 for operating a wildfire defense system comprises the following steps.

At step 1501, a notification is received of an approaching wildfire. The notification may be received by the satellite communication module 401 and passed to the controller 104, so that information about the approaching fire can be provided to a user.

At step 1502, the wildfire defense system is relocated to a geographic region to be defended from the approaching wildfire. Based on the information in the received notification, the user may move the system to a designated area that needs protection from the approaching fire.

At step 1503, one or more sprayers are positioned as needed to defend the geographic region. The user may position the sprayers to spray fire retardant over a specific region to be protected.

At step 1504, the system is powered up with its standalone power system.

At step 1505, the valves are set to mix the appropriate ratio of fluids in the first and second tanks to produce the desired ratio of fire retardant fluid. The mixed fluid is then directed by the valve positions to the appropriate sprayers.

At step 1506, the pumps are activated to start spraying the mixed fluid (fire retardant) to protect the identified geographic region.

Figure 16:
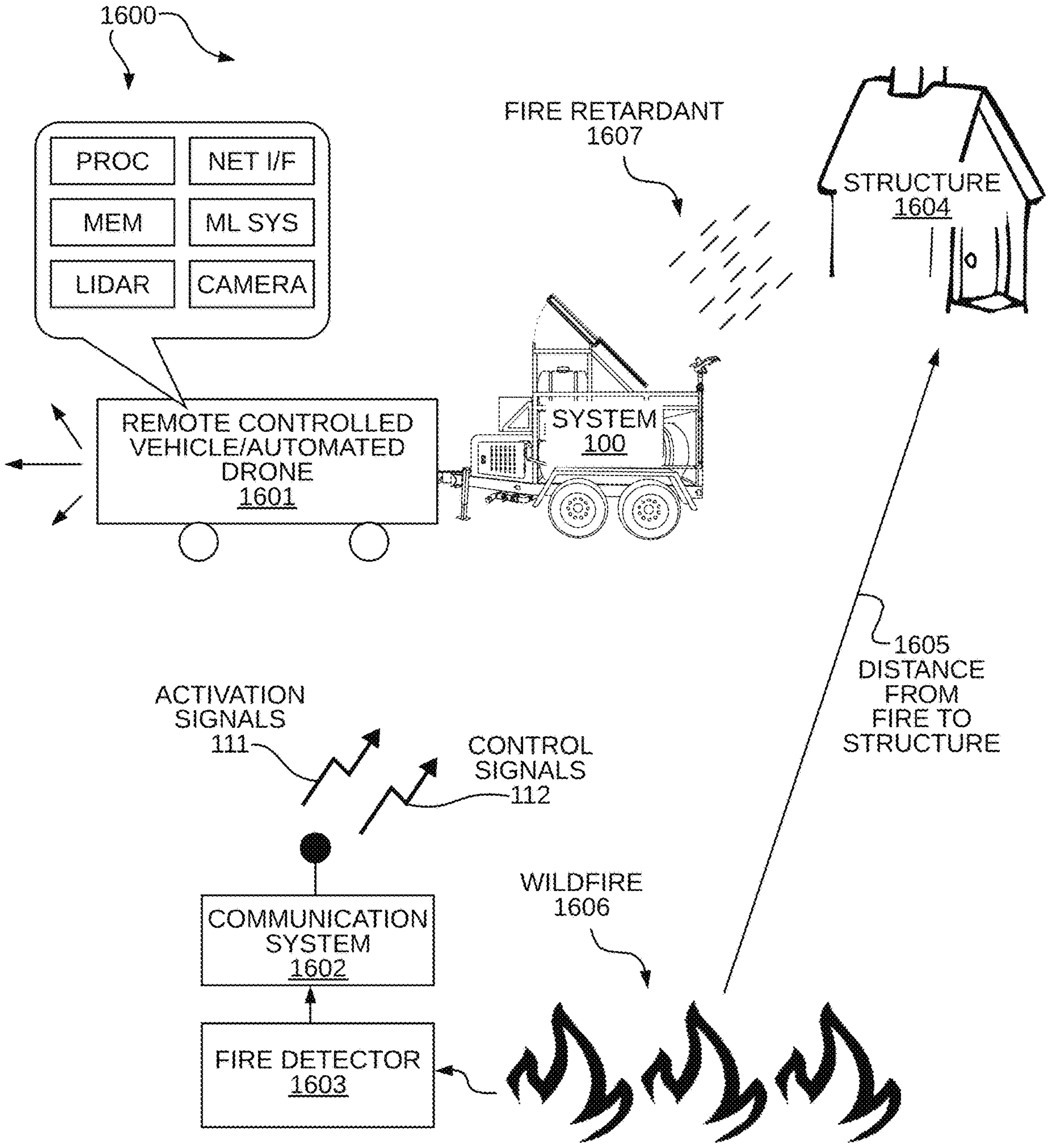
FIG. 16 is a diagram showing operations of a wildfire defense system.

FIG. 16 is a diagram showing operations of a system 1600 using the wildfire defense system 100 to protect structures. A remote controlled vehicle or drone 1601 operates to position the wildfire defense system 100 at a desired location or navigate through a pre-configured or learning-based path. The system 100 may be positioned to defend a structure 1604 from wildfires.

A fire detection system 1603 comprising any suitable type of fire detection apparatus detects the presence of a wildfire 1606. The detection system 1603 determines that the detected wildfire is moving in the direction of the structure 1604. When the wildfire 1606 gets within a selected distance 1605 from the structure 1604, the detection system 1603 utilizes a communication system 1602 to send activation and control signals 111 and/or 112 to the wildfire defense system 100. The activation and control signals 111 and 112 operate to activate the wildfire defense system 100, set a control valve, set a mixing ratio for the fire retardant, and set the sprayers to spray the mixed fire retardant 1607 over the structure 1604.

In one embodiment, the remote controlled vehicle or drone 1601 includes a processor, a memory, a Light Detection and Ranging (Lidar) sensor, a network interface, a machine learning system, and a camera. The memory stores machine readable instructions that when executed by the processor cause the drone 1601 to navigate around a property thereby positioning the wildfire system 100 at desired locations on a property. The camera and Lidar sensors may detect and map structures on a property. The machine learning system is trained to detect and identify high risk structures from high resolution images and point cloud data generated from the camera and Lidar sensors. The machine learning system uses one or more neural networks, Generative Adversarial Networks (GANs), and/or Variational Autoencoders (VAEs) to predict where, when, and how to apply fire retardant to structures.

Thus, the system 100 operates to receive information about detected wildfires, determine structures or regions that may be in danger, receive activation and control signals to the defense system 100, and begin spraying structures or regions with mixed fire retardant well before the fire arrives at the location of the protected structures or region.

Figure 17:
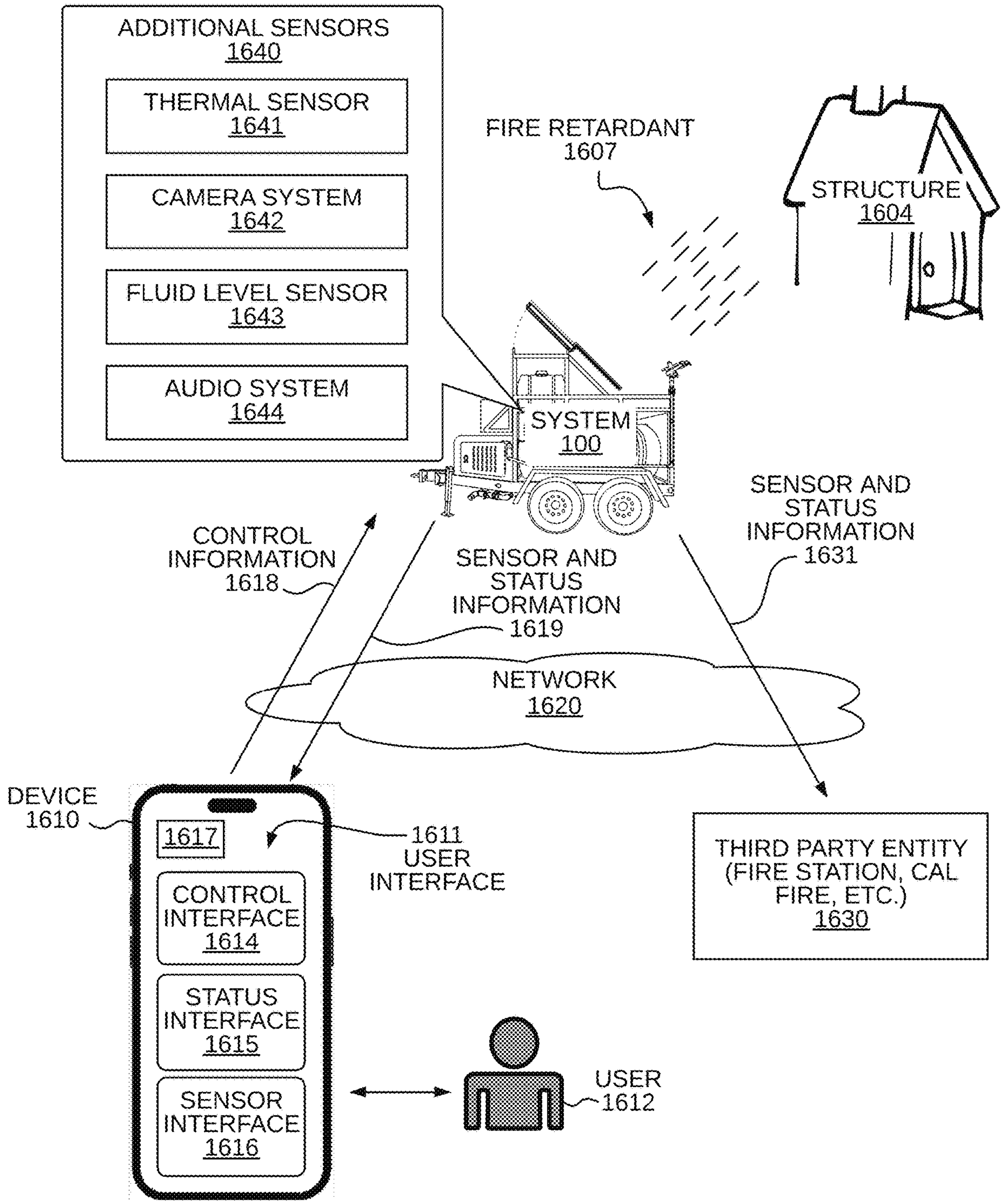
FIG. 17 is a diagram showing remote and automated operation of the wildfire defense system.

FIG. 17 is a diagram showing remote and automated operation of the wildfire defense system 100. A device 1610 remotely controls automated operation of the wildfire system 100 over a network 1620. The device 1610 is a computing device operable to present a user interface 1611 to a user 1612 and communicate information to and from wildfire defense system 100. In various embodiments, the device 1610 is a computing device operable to communicate over network, such as a mobile device, laptop, desktop computer, tablet, VR and/or AR headset, or virtual personal assistant.

The user interface 1611 includes a control interface 1614, a status interface 1615, and a sensor interface 1616. The control interface 1614 provides various user interface elements, such as buttons, switches, sliders, drop down boxes, camera, microphone, or any input that allows the user 1612 to remotely control operation of the wildfire defense system 100. The control interface 1614 allows the user 1612 to remotely control automated or manual operations of the wildfire defense system 100 as described above. In one embodiment, the user 1612 controls operation of sprayers, flow rates, and location of the system 100 in embodiments where position of system 100 is controllable. The status interface 1615 presents status information of the wildfire defense system 100, such as fluid levels in tanks, battery charge information, energy consumption information, location information, log operating and maintenance history, and any other information pertinent to operating and maintaining the wildfire defense system 100. The sensor interface 1616 provides sensor data to the user 1612, such as temperature, image, or fluid level, audio information, or any other sensor data available from the wildfire defense system 100. In one embodiment, the sensor interface shows live stream image and/or video data, temperature at or near the property, and/or audio collected at the property.

In operation, the user 1612 downloads a software application 1617 onto the device 1610. The software application 1617 presents the user interface 1611 onto the device 1610. The software application 1617 processes user input provided via the user interface 1611 and generates control information 1618. The control information 1618 is generated and communicated to the wildfire defense system 100 via the network 1620. The control box 201B (shown in FIG. 2) may communicate with the device 1610 over the network 1620. Sensor and status information 1619 is communicated from the wildfire defense system 100 over the network 1620 and onto the device 1610 and presented via the status interface 1615 and sensor interface 1616.

In one embodiment, the user 1612 is an owner of structure 1604 present on a property of the user 1612. In accordance with at least one novel aspect, the user 1612 is able to remotely control wildfire defense system 100 while safely away from the property during the event of a wildfire. The user 1612 does not need to remain on their property or near structure 1604 to protect their property against wildfires. The user 1612 is able to activate and monitor wildfire defense system 100 remotely and away from danger.

In various embodiments, a third party entity 1630 receives information from the wildfire defense system 100. The third party entity 1630 is any entity that is provided access to sensor and status information 1631, such a firefighting station, a government entity, such as California Department of Forestry and Fire Protection, or another entity associated with collecting information about wildfires. The third party entity 1630 is configured to receive sensor and status information 1631 from the wildfire defense system 100 over the network 1620. For privacy, the user 1612 is able to control what information is available to third party entity 1630. The third party entity 1630 shares and uses such information to protect property, land, and others from active or imminent wildfires.

The wildfire defense system 100 optionally includes additional sensors 1640. In this example, the wildfire defense system 100 includes a thermal sensor 1641, a camera system 1642, a fluid level sensor 1643, and an audio system 1644. The thermal sensor 1641 uses infrared temperature sensing or other techniques to sense temperature at or near the wildfire defense system 100. The wildfire defense system 100 uses sensed temperature information in operation to protect structures and to communicate the temperature information over the network 1620.

The camera system 1642 includes one or more image sensors that capture image and/or video. The image and/or video provide useful information about status of property and surrounding structures and also provide guidance to propulsion systems operable to navigate the wildfire defense system 100. In one embodiment, the remote controlled vehicle or drone 1601 shown in FIG. 16 uses the image and/or video data to control the position of the wildfire defense system 100. In one example, the thermal sensor data and image data are used by a machine learning system to navigate a property, identify structures at risk, and automatically disperse fire retardant onto detected structures.

The fluid level sensor 1643 provides fluid level information of water, thermal gels, fire retardant/suppressant materials, or any other fluids that cycle through the wildfire defense system 100. In embodiments where the wildfire defense system 100 is mobile and includes tanks, such as tanks 102 and 103 of FIG. 1, the fluid level sensor 1643 provides information of fluids remaining in the tanks. In one embodiment, if the first tank 102 is running low on water, or if the second tank 103 is running low on fire retarding gel, the user 1612 is notified. In embodiments where the wildfire defense system 100 is fixed or connected to a dedicated tank or fluid source, the fluid level sensor 1643 provides information of remaining fluid in the tank or fluid source. If the wildfire defense system 100 is fixed and connected to a dedicated tank or pond, the fluid level sensor 1643 indicates when the fluid levels of the source are low.

The audio system 1644 includes microphone or speakers and allows the wildfire defense system 100 to detect and broadcast audio detected at the property and generate audio alerts or other output provided from a remote station. In one embodiment, the wildfire defense system 100 outputs an alarm notifying neighboring properties of potential wildfire risk. In another example, the wildfire defense system 100 provides audio data collected via microphone and streams the audio data to the user 1612 or other interested parties to remain informed on what is occurring on the property.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A wildfire defense system, wherein the wildfire defense system is operable to prevent wildfires from causing damage to a protected structure or region comprising:

a first tank, wherein the first tank is configured to store water;

an automated valve having an input, a first output, and a second output, wherein the automated valve is operable in a primary mode and a recirculation mode;

a second tank, wherein the second tank has an input and an output, wherein the input of the second tank is fluidly coupled to the second output of the automated valve, wherein the second tank is configured to store fire retardant gel;

a mixing valve having an input and an output, wherein the mixing valve is configured to receive the water from the first tank and the fire retardant gel from the second tank and to output a fire retardant fluid;

a first pump coupled between the first tank and the input of the mixing valve;

a hydraulic flow control valve;

a second pump coupled between the second tank and the input of the mixing valve via the automated valve and the hydraulic flow control valve, wherein the input of the automated valve is fluidly coupled to the second pump, wherein the first output of the automated valve is fluidly coupled to the hydraulic flow control valve, wherein the second output of the automated valve is fluidly coupled to the input of the second tank, and wherein the first output of the automated valve is fluidly coupled to the mixing valve;

a motor configured to drive the second pump, wherein when the automated valve is operable in the primary mode, fire retardant gel flows from the second pump to the hydraulic flow control valve via the input and first output of the automated valve, and from the hydraulic flow control valve to the input of the mixing valve, and wherein in the recirculation mode, fire retardant gel flows from the second output of the automated valve into the input of the second tank;

a controller operatively coupled to the first pump, the second pump, and the mixing valve, wherein the controller is remotely controlled over a network to activate the mixing valve to mix the water stored in the first tank with the fire retardant gel stored in the second tank thereby forming the fire retardant fluid and to spray the fire retardant fluid onto a protected structure or region according to a preconfigured and automated cycle, wherein the controller is also configured to operate in a clean and feed mode, and wherein in the clean and feed mode, a cleaning solution is cycled through the wildfire defense system, wherein the controller controls the first pump, the second pump, the hydraulic flow control valve, and the mixing valve such that the fire retardant fluid has a configurable ratio of the water to the fire retardant gel, wherein the controller is further configured to operate the wildfire defense system in a system flush and/or rehydrate mode and a thermogel tank recirculation mode, wherein the clean and feed mode comprises a mineral oil clean and feed mode, wherein the system flush and/or rehydrate mode comprises a water-only mode in which only water is cycled through the wildfire defense system, and wherein the preconfigured and automated cycle causes the wildfire defense system to automatically rotate spraying among a plurality of zones and to stop upon completion of the plurality of zones;

a communication system, wherein the communication system is communicatively coupled to the controller, wherein the communication system is configured to receive a wireless activation signal that remotely switches on the wildfire defense system, and wherein the wireless activation signal is generated by a remote user device or by a remote fire detection system that detects wildfire approaching the protected structure or region, wherein the remote fire detection system comprises a fire detector configured to detect a distance from the wildfire to the protected structure or region and to generate the wireless activation signal based on the detected distance, and wherein the preconfigured and automated cycle is executed in response to receiving the wireless activation signal and causes the wildfire defense system to spray the fire retardant fluid before fire arrives at the protected structure or region;

one or more sprayers coupled to the output of the mixing valve; and a trailer with a hitch, wherein the trailer is detachably coupled to a vehicle, wherein the trailer includes at least two wheels, wherein the trailer is movable wherein the wildfire defense system is maintained near the protected structure or region, and wherein the wildfire defense system is activated to spray the fire retardant fluid before fire arrives at the protected structure or region.

2. The wildfire defense system of claim 1, wherein the trailer with the hitch is configured to relocate the wildfire defense system, and wherein the first tank, the second tank, the mixing valve, the first pump, the second pump, the controller, and the one or more sprayers are disposed on the trailer with the hitch.

3. The wildfire defense system of claim 1, further comprising:

a power system, wherein the power system supplies power to the controller, the first pump, the second pump, and the mixing valve.

4. The wildfire defense system of claim 1, wherein the controller controls the mixing valve, the first pump, the second pump, and the hydraulic flow control valve such that the fire retardant fluid that is output from the output of the mixing valve has a configurable ratio of water stored in the first tank to fire retardant gel stored in the second tank.

5. The wildfire defense system of claim 1, wherein the controller comprises:

a memory that stores instructions; and a processor, wherein when the instructions are executed or interpreted by the processor, the instructions cause the processor to control the mixing valve, the first pump, and the second pump to generate the fire retardant fluid that is output by the one or more sprayers in response to receiving the wireless activation signal according to the preconfigured and automated cycle.

6. The wildfire defense system of claim 1, wherein the first tank has a storage capacity that is more than ten times that of the second tank.

7. The wildfire defense system of claim 1, wherein the one or more sprayers include a first sprayer of a first type and a second sprayer of a second type.

8. The wildfire defense system of claim 7, wherein the first sprayer of the first type is coupled to the mixing valve via a first control valve, and wherein the second sprayer of the second type is coupled to the mixing valve via a second control valve.

9. The wildfire defense system of claim 7, wherein the first sprayer of the first type is a fixed location sprayer, and wherein the second sprayer of the second type is a manual sprayer.

10. The wildfire defense system of claim 1, wherein the cleaning solution cycled through the wildfire defense system in the clean and feed mode is mineral oil.

11. The wildfire defense system of claim 1, wherein the system sprays structures or regions with fire retardant fluid before fire arrives at the location of the protected structure or region.

12. A fire prevention method comprising:

storing an amount of water in a first tank;

storing an amount of fire retardant gel in a second tank;

receiving a wireless activation signal over a network, wherein the wireless activation signal is generated by a remote user device or by a remote fire detection system that detects wildfire approaching a protected structure or region, and wherein the remote fire detection system comprises a fire detector configured to detect a distance from the wildfire to the protected structure or region and to generate the wireless activation signal based on the detected distance;

remotely controlling a pump system and a mixing valve in response to receiving the wireless activation signal to combine the water stored in the first tank with the fire retardant gel stored in the second tank according to a configurable ratio thereby generating a fire retardant fluid and to spray the fire retardant fluid onto the protected structure or region according to a preconfigured and automated program, wherein the program automatically rotates spraying among a plurality of zones and stops upon completion of the plurality of zones;

outputting the fire retardant fluid from one or more sprayers, wherein the first tank, the second tank, the pump system, and the mixing valve are disposed on a transportable structure, wherein the transportable structure is maintained near the protected structure or region, and wherein the pump system is activated to spray the fire retardant fluid before fire arrives at the protected structure or region;

controlling the pump system to operate in a recirculation mode, wherein in the recirculation mode, a second pump and an automated valve having an input, a first output, and a second output, wherein the second output operates to recirculate fire retardant gel in the second tank, wherein the fire retardant gel flows through the second pump and the input and the second output of the automated valve, wherein the input of the automated valve is fluidly coupled to the second pump, wherein the second output of the automated valve is fluidly coupled to an input of the second tank, and wherein in the recirculation mode the automated valve couples the input to the second output; and controlling the pump system to operate in a clean and feed mode, wherein in the clean and feed mode, a cleaning solution is cycled through the pump system.

13. The fire prevention method of claim 12, further comprising:

setting the configurable ratio to a desired value.

14. The fire prevention method of claim 12, further comprising:

supplying power from a power source to the pump system, wherein the power source is disposed on the transportable structure.

15. The fire prevention method of claim 12, wherein the pump system includes a first pump and a second pump, wherein the first pump draws the water from the first tank, and wherein the second pump draws the fire retardant gel from the second tank.

16. The fire prevention method of claim 15, wherein the first pump is driven by an engine, and wherein the second pump is driven by a motor.

17. The fire prevention method of claim 12, further comprising:

moving the transportable structure while outputting the fire retardant fluid from the one or more sprayers thereby distributing the fire retardant fluid throughout an area surrounding the transportable structure.

* * * * *